July 13, 1926.

H. A. HOUSE

MACHINE FOR MANUFACTURING AND PACKING ARTICLES OF FOOD

Filed April 30, 1926   19 Sheets-Sheet 1

1,592,768

INVENTOR
HENRY A HOUSE
BY
Pennie, Davis, Marvin & Edmonds
ATTORNEYS

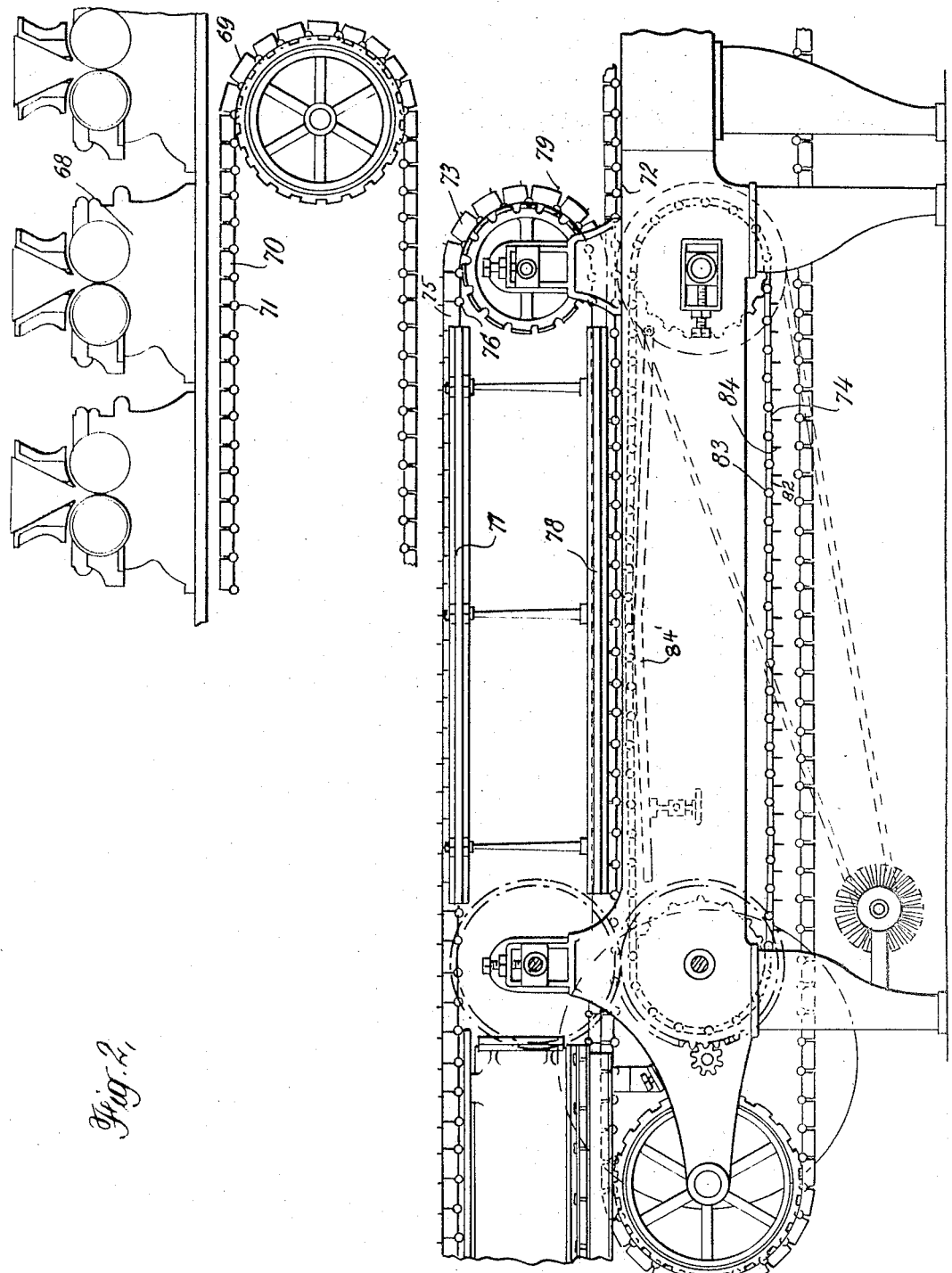

July 13, 1926.
H. A. HOUSE
1,592,768
MACHINE FOR MANUFACTURING AND PACKING ARTICLES OF FOOD
Filed April 30, 1925    19 Sheets-Sheet 3
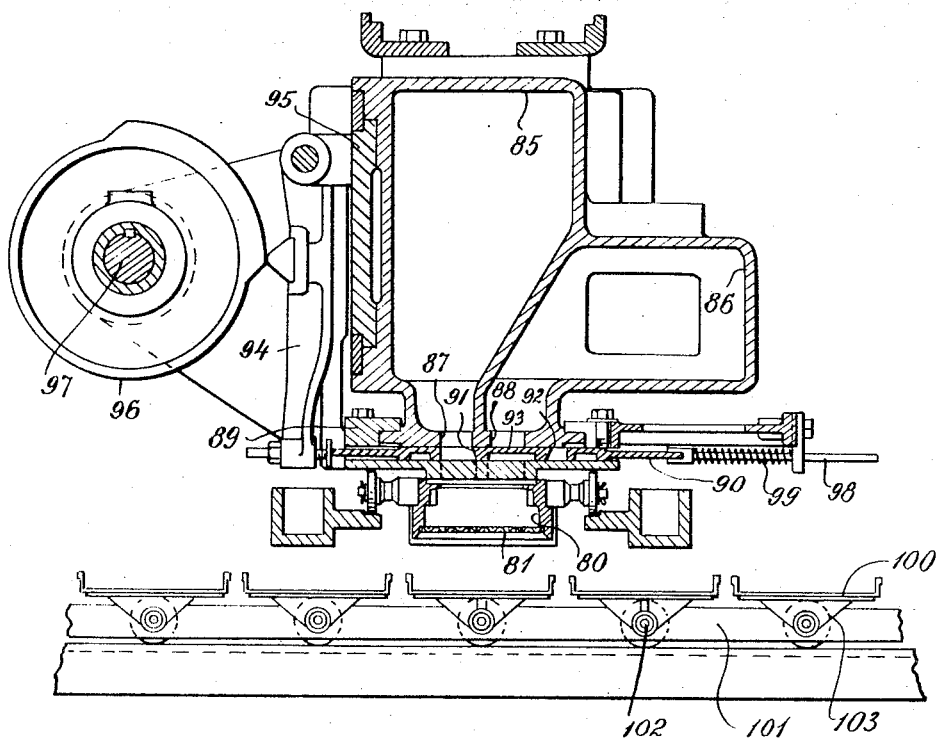
Fig. 3,
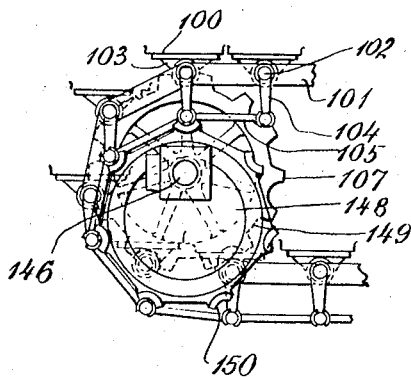
Fig. 5,
INVENTOR
HENRY A. HOUSE
BY
ATTORNEY

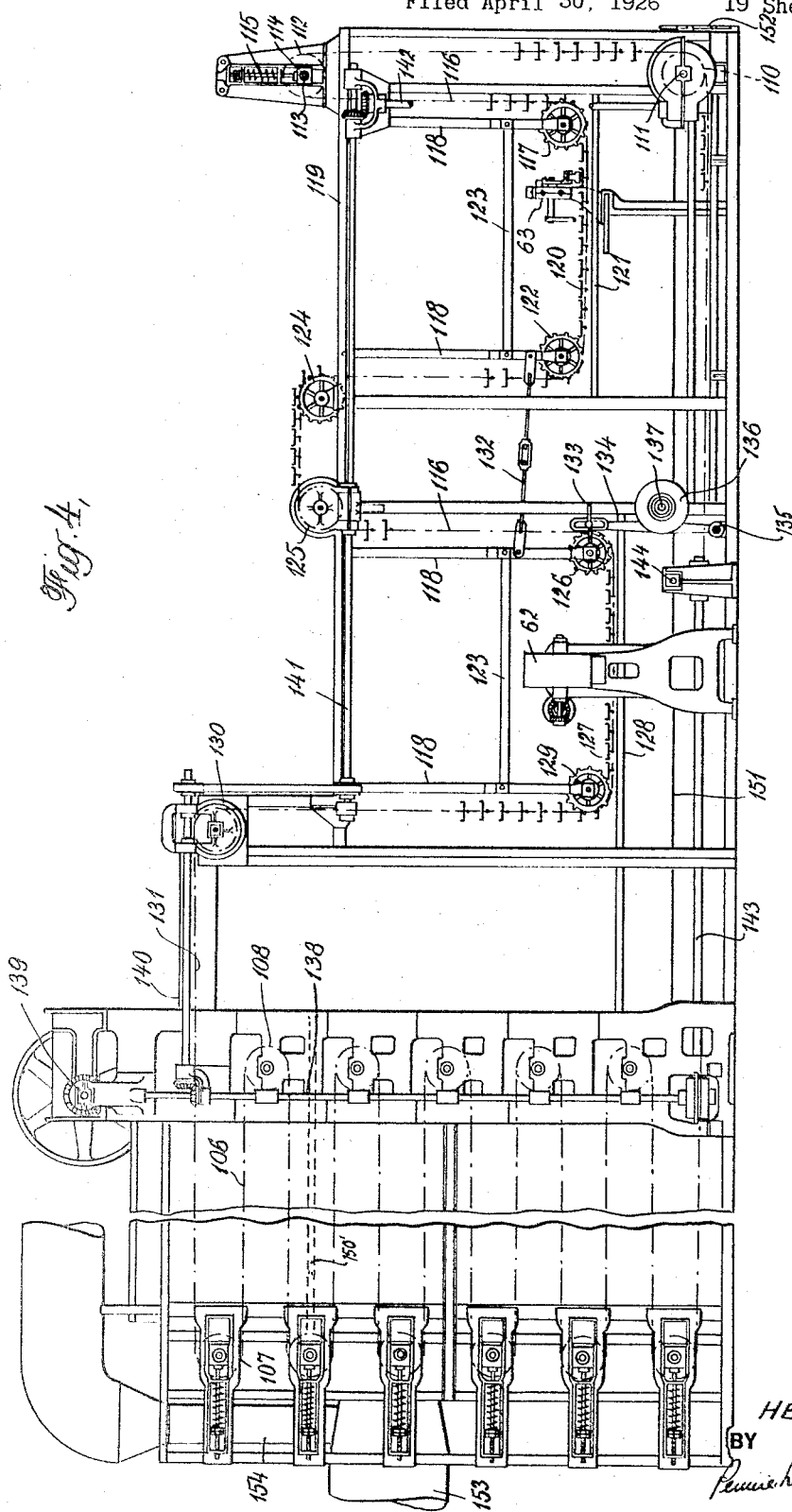

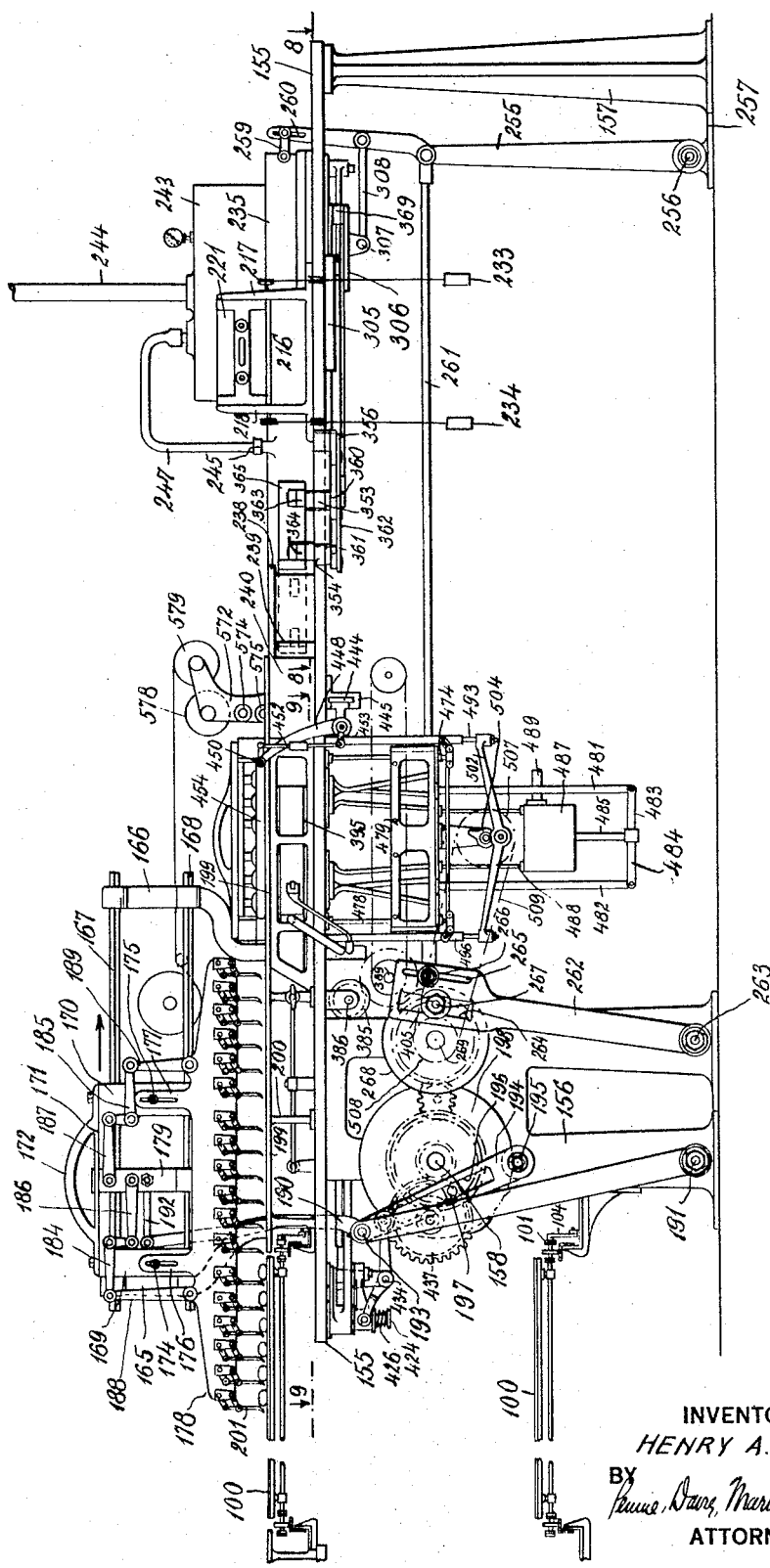

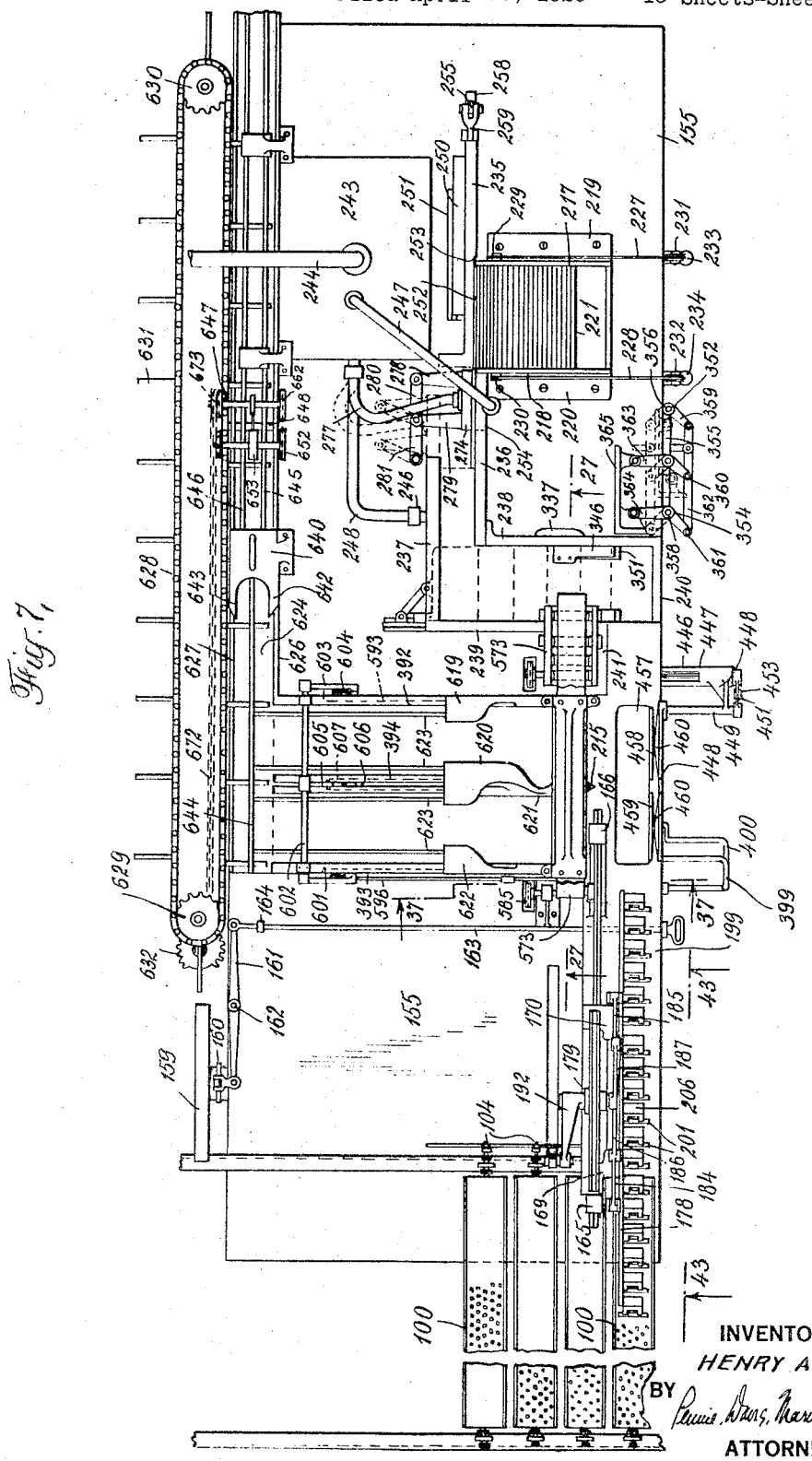

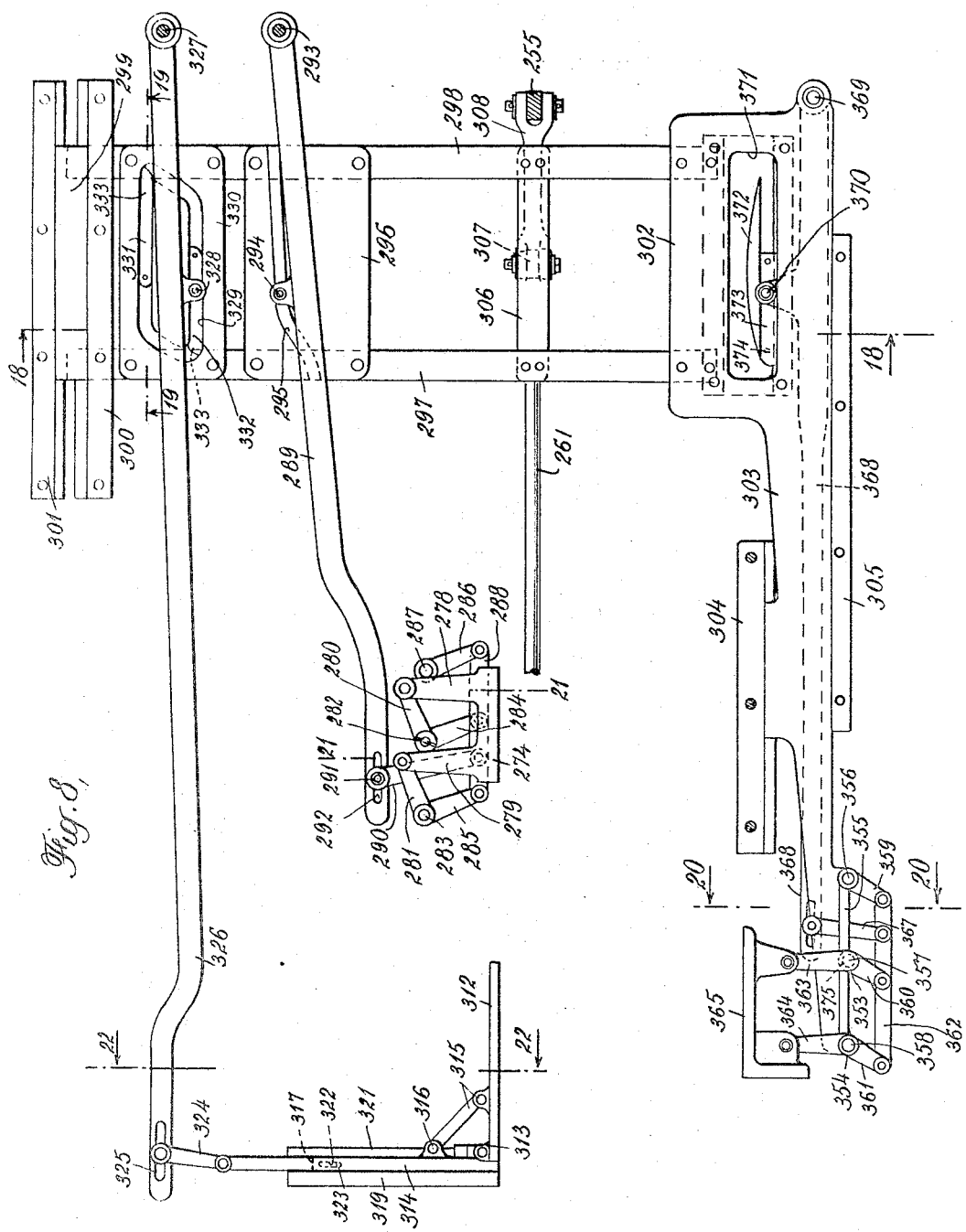

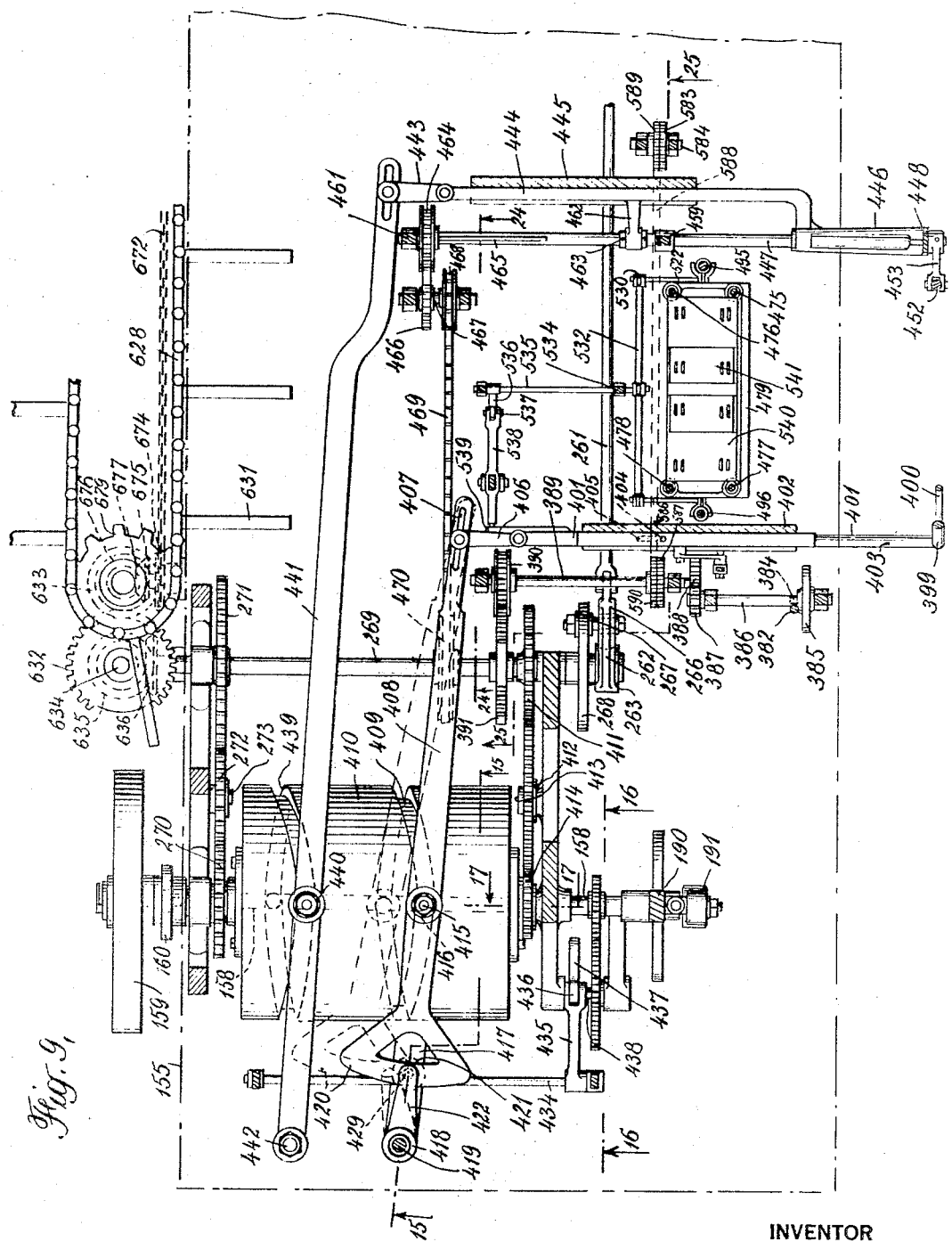

July 13, 1926.  
H. A. HOUSE  
MACHINE FOR MANUFACTURING AND PACKING ARTICLES OF FOOD  
Filed April 30, 1926  
1,592,768  
19 Sheets-Sheet 9

INVENTOR  
HENRY A. HOUSE  
BY  
ATTORNEYS

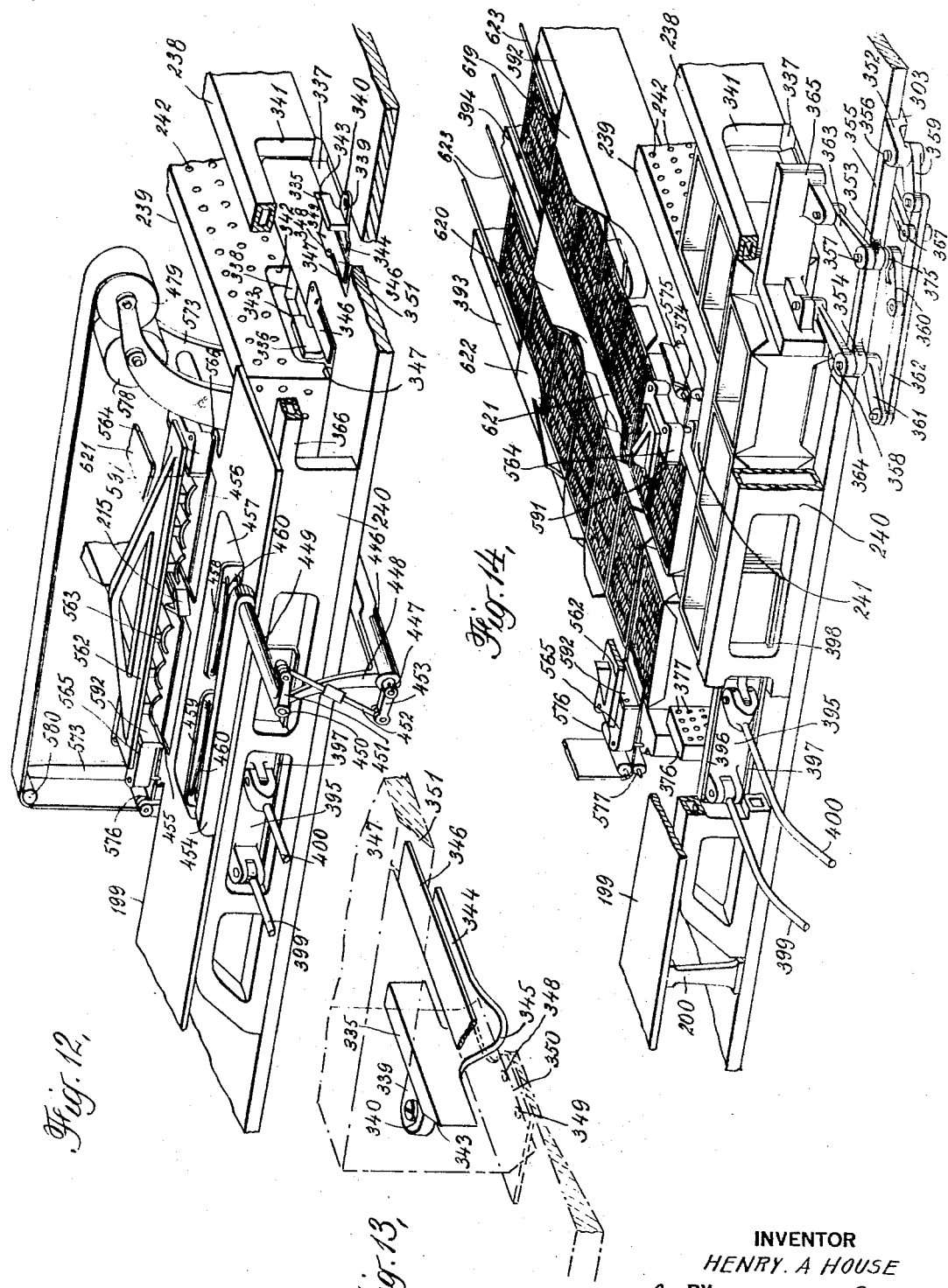

July 13, 1926.
H. A. HOUSE
1,592,768
MACHINE FOR MANUFACTURING AND PACKING ARTICLES OF FOOD
Filed April 30, 1926  19 Sheets-Sheet 11
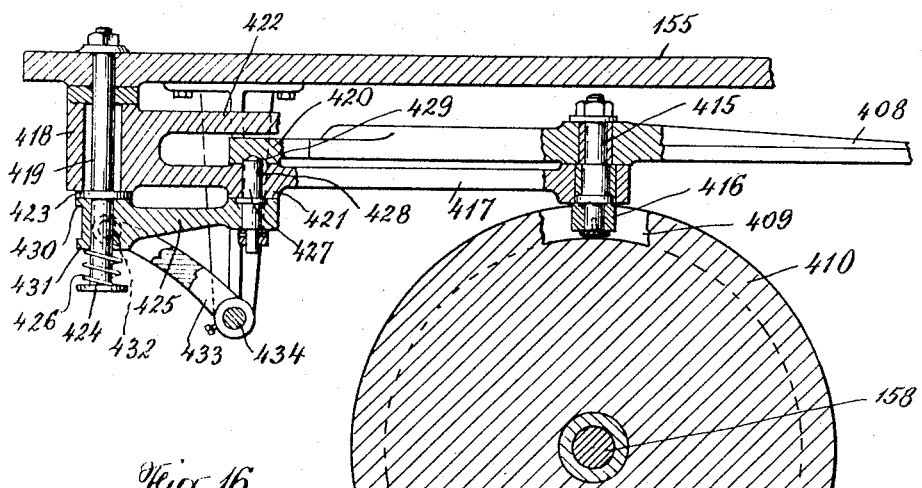
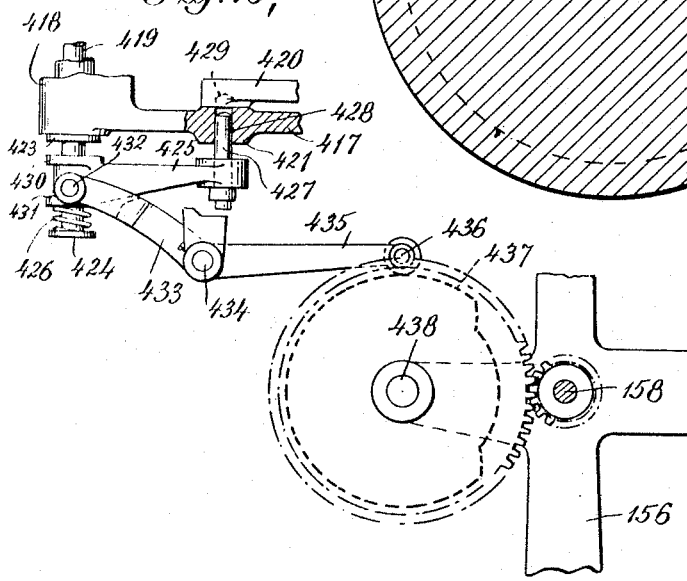
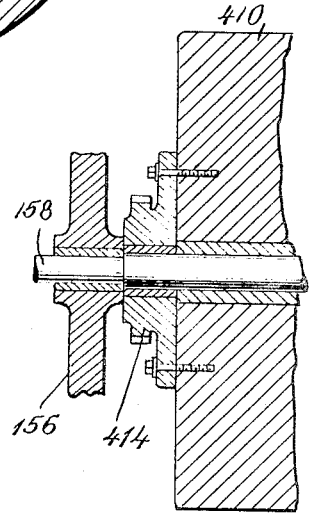
INVENTOR
*HENRY A. HOUSE*
BY
ATTORNEYS

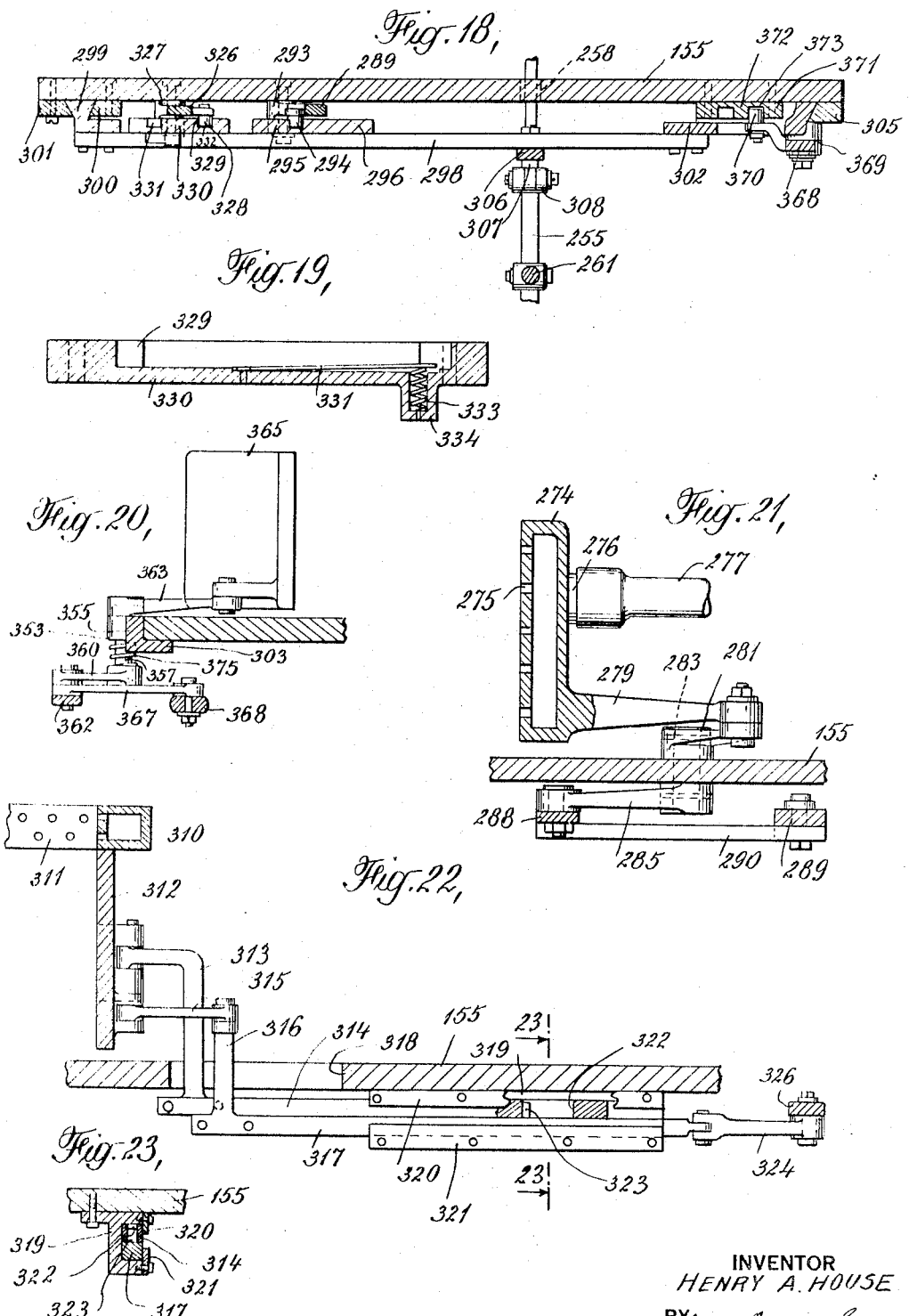

July 13, 1926.  1,592,768
H. A. HOUSE
MACHINE FOR MANUFACTURING AND PACKING ARTICLES OF FOOD
Filed April 30, 1926   19 Sheets-Sheet 13
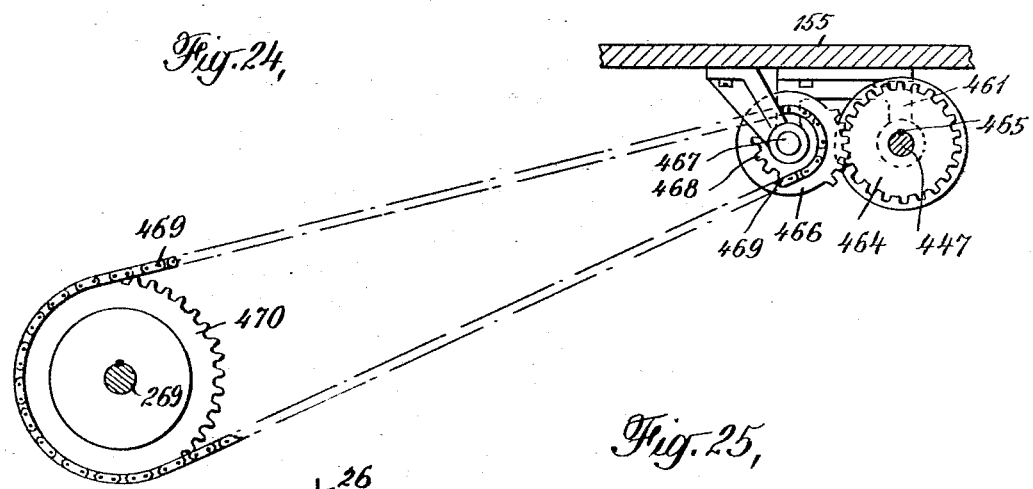
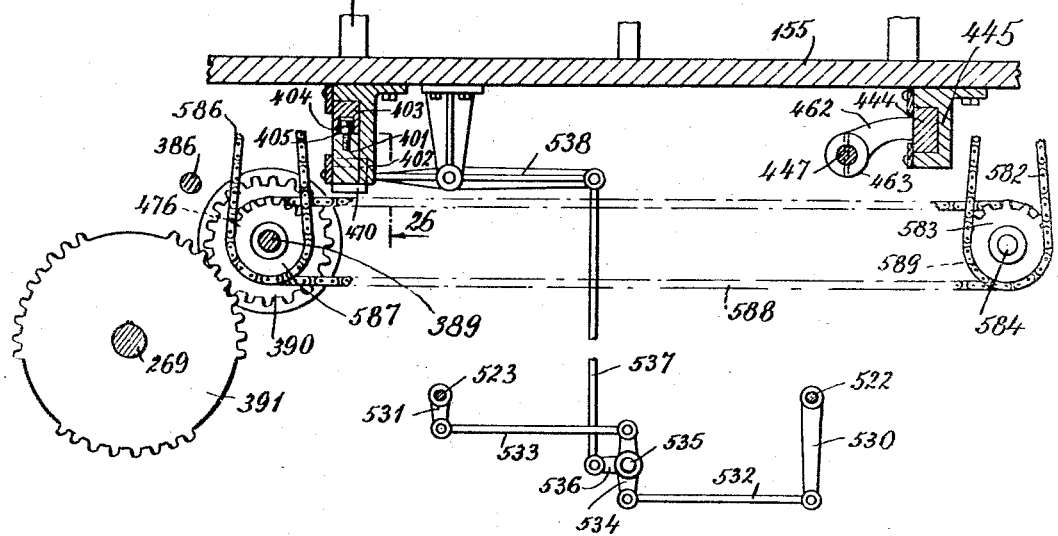
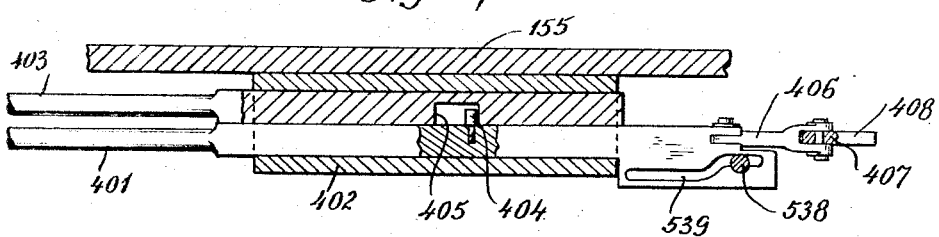
INVENTOR
HENRY A. HOUSE
BY
ATTORNEYS July 13, 1926.  
H. A. HOUSE  
1,592,768  
MACHINE FOR MANUFACTURING AND PACKING ARTICLES OF FOOD  
Filed April 30, 1926 19 Sheets-Sheet 14
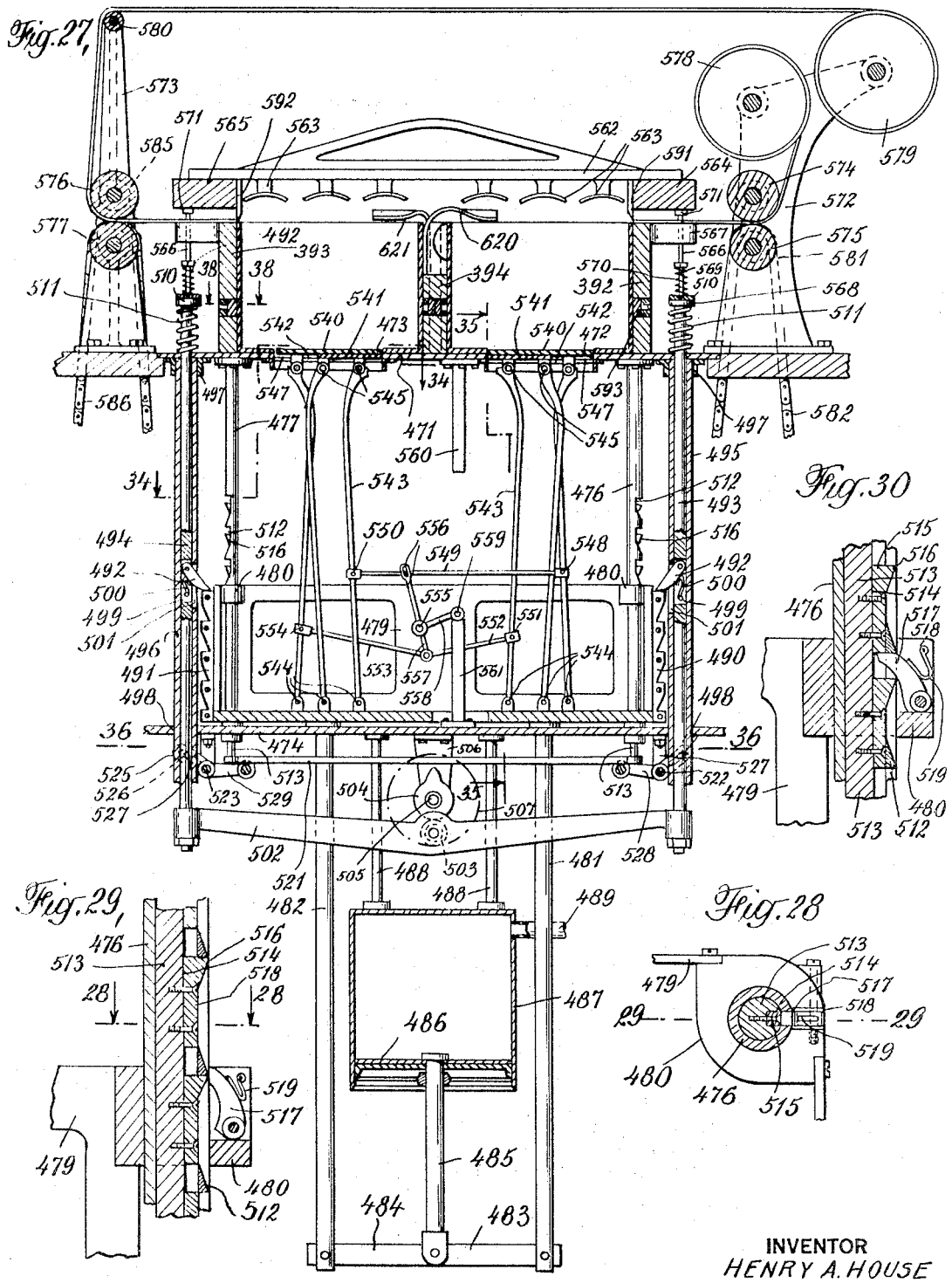
INVENTOR  
HENRY A. HOUSE  
BY  
ATTORNEYS July 13, 1926.
H. A. HOUSE
1,592,768
MACHINE FOR MANUFACTURING AND PACKING ARTICLES OF FOOD
Filed April 30, 1926   19 Sheets-Sheet 15
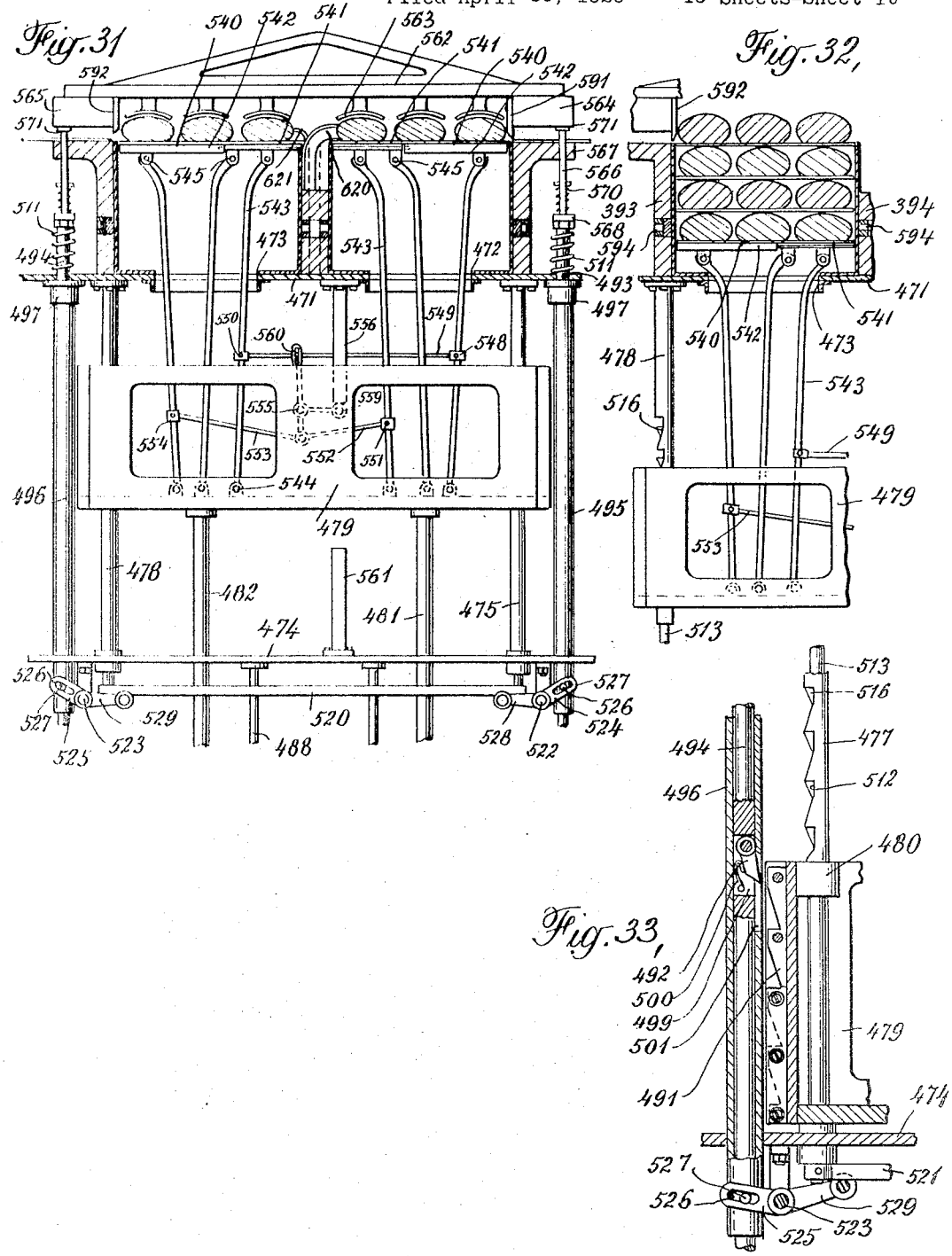
INVENTOR
HENRY A. HOUSE
BY
ATTORNEYS

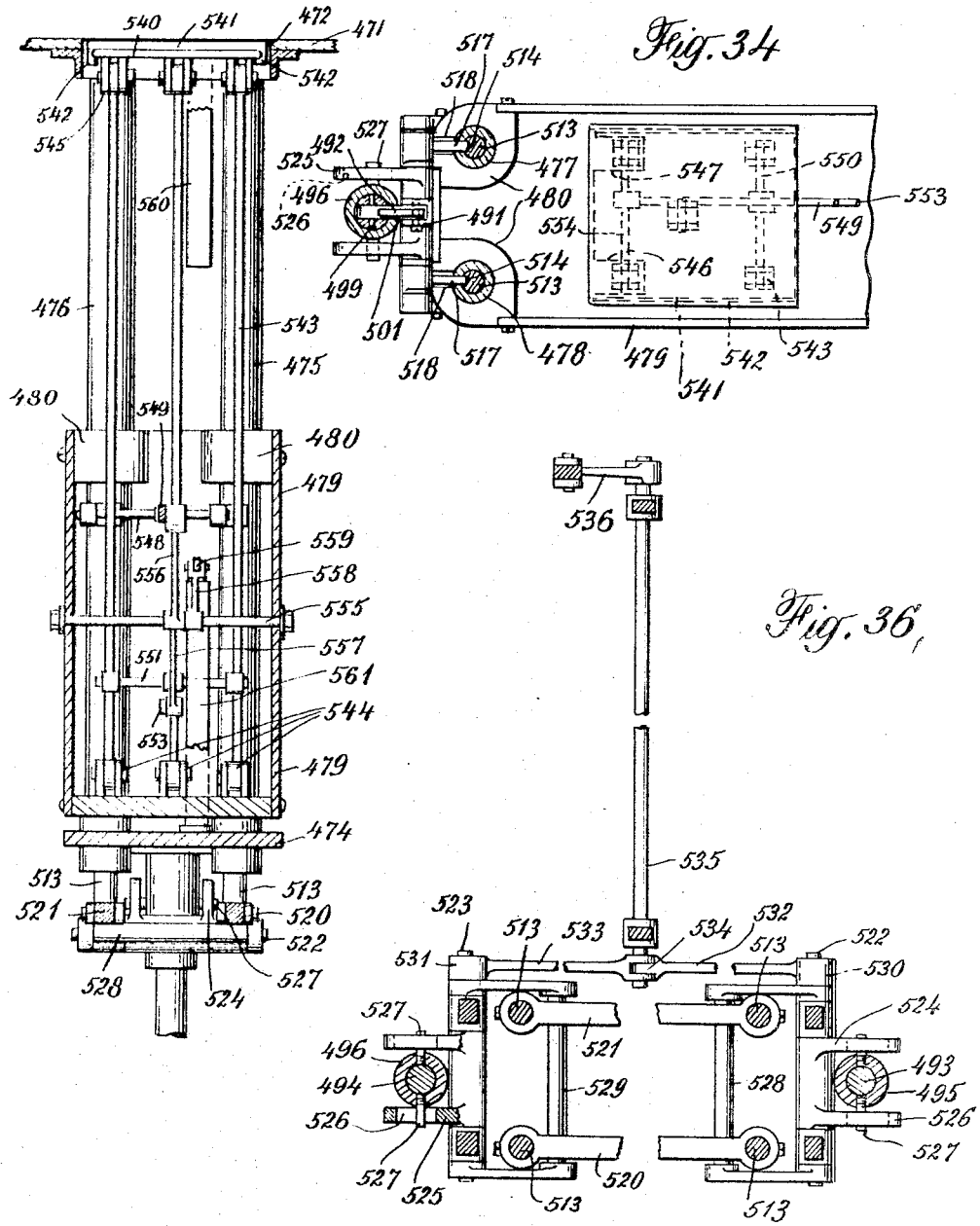

July 13, 1926.
H. A. HOUSE
1,592,768
MACHINE FOR MANUFACTURING AND PACKING ARTICLES OF FOOD
Filed April 30, 1926   19 Sheets-Sheet 17
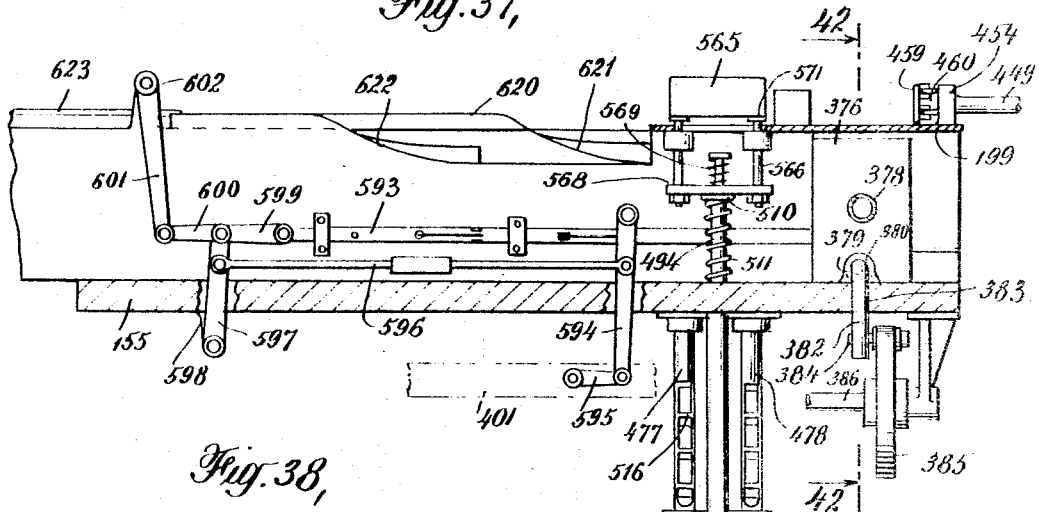
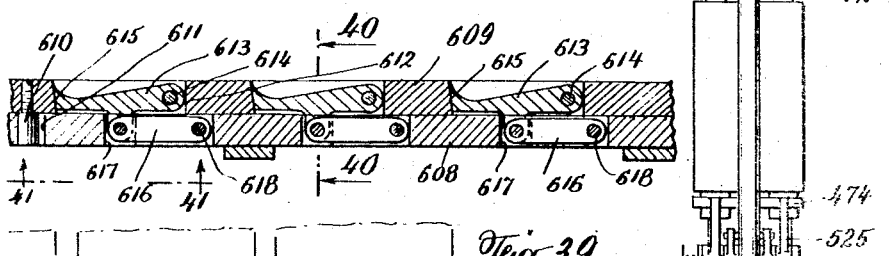
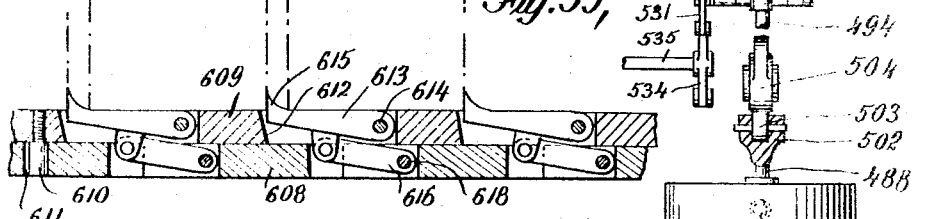
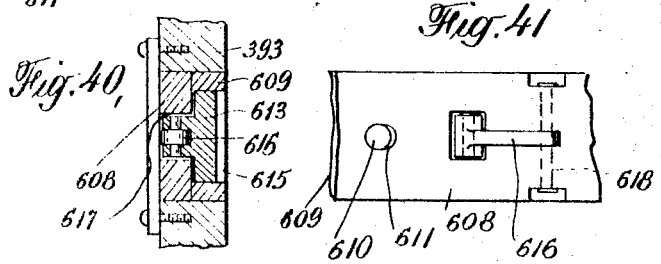
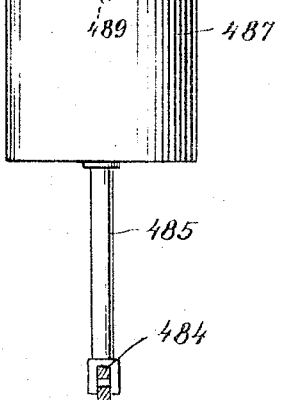
INVENTOR
HENRY A. HOUSE
BY
ATTORNEYS July 13, 1926.
H. A. HOUSE
1,592,768
MACHINE FOR MANUFACTURING AND PACKING ARTICLES OF FOOD
Filed April 30, 1926    19 Sheets-Sheet 18
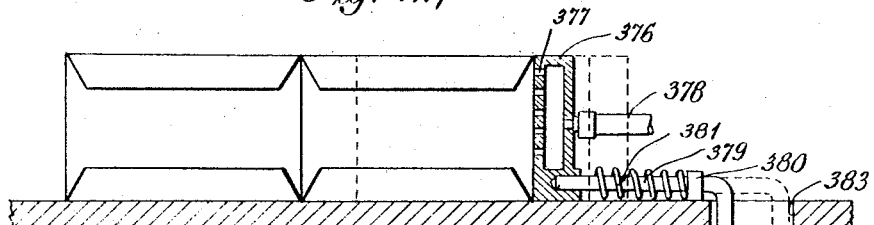
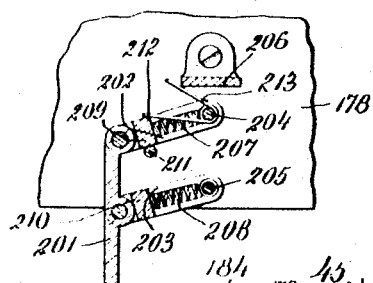
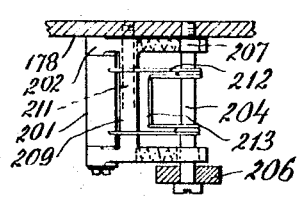
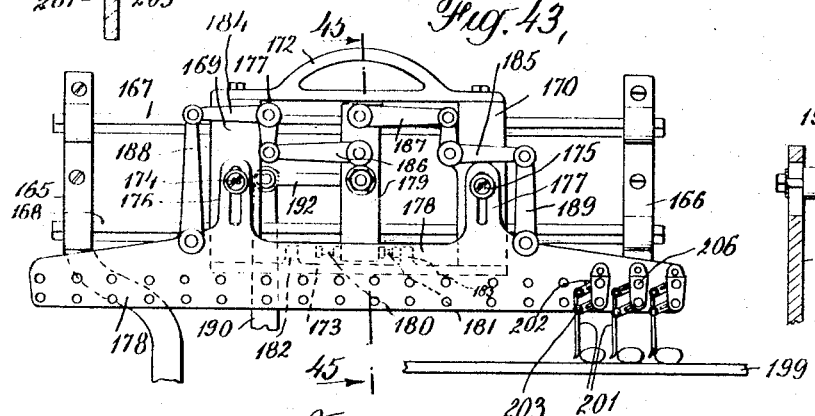
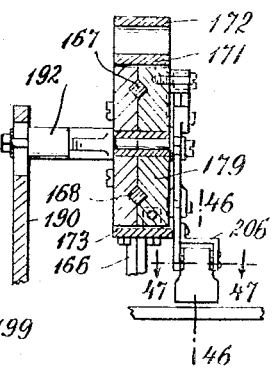
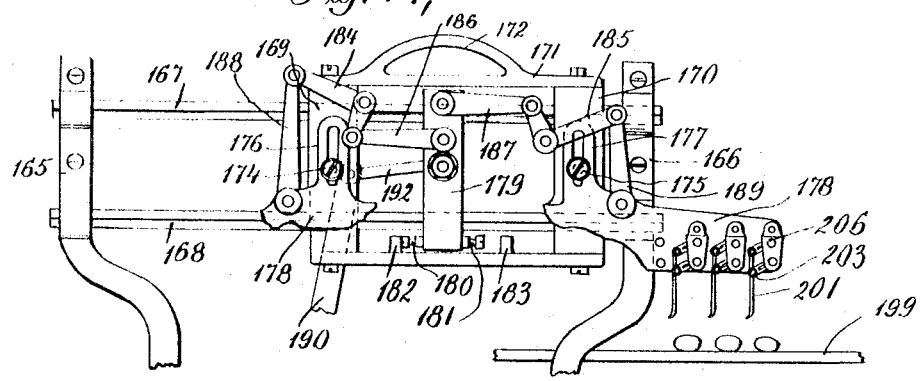
INVENTOR
HENRY A. HOUSE
BY
ATTORNEYS

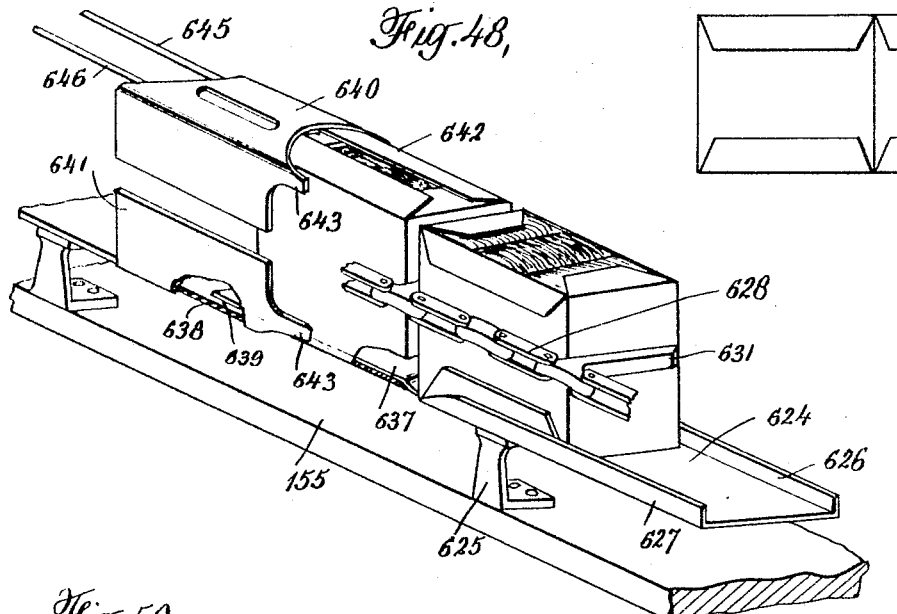
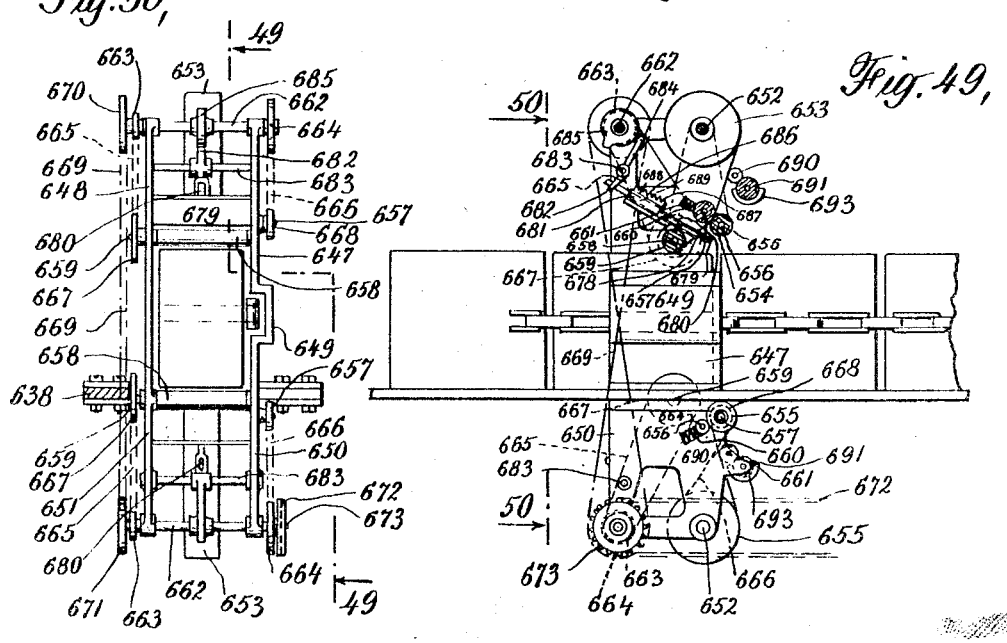

Patented July 13, 1926.

1,592,768

UNITED STATES PATENT OFFICE.

HENRY ALONZO HOUSE, OF BRIDGEPORT, CONNECTICUT, ASSIGNOR TO THE SHREDDED WHEAT COMPANY, OF NIAGARA FALLS, NEW YORK, A CORPORATION OF NEW YORK.

MACHINE FOR MANUFACTURING AND PACKING ARTICLES OF FOOD.

Application filed April 30, 1926. Serial No. 105,683.

This invention relates to the manufacture of articles of food, such as cereal biscuits, and has to do more particularly with automatic apparatus for performing the several operations involved in producing the articles and packing them in selected quantities in sealed cartons ready for commercial distribution. The apparatus, while capable of use in the manufacture of numerous products, is especially adapted for the production of cereal filamentous biscuits of the shredded wheat type, and a form of the apparatus suitable for that product will be described, although it is to be understood that this use is merely by way of example.

In the manufacture of cereal biscuits as now practiced, numerous manual operations are required. For example, the biscuits formed from the cereal grain by appropriate devices are deposited upon trays which are conveyed to the baking ovens where the trays are inserted in and removed from the ovens manually by the bakers. Then, in a further manual operation, the trays of baked biscuits are caused to traverse a heated chamber wherein the biscuits are thoroughly dried, after which the trays are conveyed to packing tables where the biscuits are removed by packers who prepare cartons from blanks and fill the cartons. The filled cartons are then placed on a conveyor which carries them through devices for closing and sealing the cartons and delivers them at a convenient point in condition for shipment. Owing to the numerous manual operators, such as packers, bakers, etc., required to carry out this method of manufacture, the labor charge is an important element in the final cost and the necessary distribution of the different machines and ovens requires a great deal of floor space. Also, the rate of production is relatively low and can only be increased by duplication of mechanism and of the number of operators.

The object of the present invention is to provide a machine in which the several operations involved in the production of the biscuits and the formation, filling, and sealing of the cartons may be carried on by mechanism which operates automatically and continuously, the various steps in the manufacture being carried out in proper sequence so that the product passes from one mechanism to another successively, eventually being led to a carton-filling mechanism where the biscuits are packed into cartons of the desired capacity and the cartons are closed and sealed ready for distribution.

The new machine includes a baking oven of substantial size, a conveyor which moves into, through, and out of the baking oven and if desired a drying chamber, automatic mechanism for shredding the wheat, making the biscuits from the shreds and depositing the uncooked biscuits upon the conveyor at a suitable point, and automatic mechanism cooperating with the conveyor at a point outside the oven for removing the cooked biscuits from the conveyor and placing them in selected quantities in cartons. The conveyor employed is preferably arranged for continuous slow movement as a whole and periodic arresting of the movement of a portion or portions thereof which cooperate with the automatic mechanism for supplying the uncooked biscuits to the conveyor and removing the cooked ones therefrom.

The operations of making the biscuits and supplying them to the conveyor are preferably accomplished by a mechanism similar to those heretofore employed and this mechanism is arranged transverse to the travel of the conveyor so that a plurality of uncooked biscuits are delivered at regular intervals to the conveyor in a row extending across the latter. This mechanism receives the prepared wheat, shreds it, deposits the shreds upon a traveling linkbelt, cuts the strand of shreds to form the biscuits, then supports the biscuits from above while carrying them out over the conveyor and then drops a plurality of the biscuits simultaneously to deposit them on the conveyor in a row extending crosswise thereof. This mechanism is actuated in synchronism with the movement of the conveyor so that the dropping of a row of biscuits takes place when the portion of the conveyor which receives the biscuits is, in effect, at rest.

The automatic mechanism for removing the cooked biscuits from the conveyor includes a reciprocating member which engages a group of biscuits on the conveyor and moves these biscuits in a row off the conveyor and upon a suitable receiver. A series of individual engaging elements, one for each biscuit in a row, is mounted upon this reciprocating member so that each biscuit is moved free of contact with every other biscuit of the row. This is of importance both to prevent injury to the fragile biscuits, and also to keep accurate control of the positions of all the biscuits and thus make automatic packaging possible. The operation of this reciprocating member or rake is timed accurately with reference to the movement of the conveyor so that the removal of a row of biscuits takes place when the portion of the conveyor with which the rake cooperates, is, in effect, at rest.

This automatic delivery mechanism moves the biscuits of a row or group from the conveyor to a carton-filling station, each biscuit being moved in a straight line transverse to the direction of movement of the conveyor. Preferably the movement is in several steps, the biscuits being first moved off the conveyor and upon an inspection platform, along which they are moved in successive steps to a position from which they are delivered to the carton-filling devices. The cartons are moved to the carton-filling position automatically, being fed successively from a stack of cartons in collapsed condition and in the course of their movement opened and acted upon by folding devices which turn the flaps of the cartons appropriately. At the filling station, groups of biscuits are introduced into the cartons to form successive layers therein, the cartons containing, for example, twelve biscuits in four layers of three biscuits each. Strips of paper are placed in the cartons between successive layers by appropriate mechanism during the filling operation. Since the biscuits are of a delicate structure, they cannot be allowed to drop into position in the cartons. Consequently, at the filling station a platform is provided which is projected up through the carton to be filled. A layer of biscuits is then moved upon the platform and the platform lowered a step. A strip of paper is now placed over the layer of biscuits; then another layer of biscuits is put in position and the platform lowered a second step, these operations being repeated until the carton is filled. It is then ejected from the packing devices, acted upon by a folding mechanism which turns the flaps to close the carton, and then the carton is sealed by suitable sealing devices.

For a better understanding of the invention, reference will be made to the accompanying drawings. in which there is illustrated an embodiment of the invention suitable for the manufacture of shredded wheat biscuits. In these drawings, Fig. 1 is a plan view of the complete apparatus with certain parts broken away or removed, Fig. 2 is a view in side elevation of the shredding devices, the strand conveyor, and the biscuit forming devices, Fig. 3 is a transverse section through the biscuit depositing mechanism taken from line 3—3 of Fig. 1, Fig. 4 is a side view of the apparatus, with certain parts broken away and removed.

Fig. 5 is a view in elevation of a portion of the baking conveyor, showing the manner in which the pans of the conveyor are maintained upright at all times, Fig. 6 is a view in side elevation of the biscuit removal device and the mechanism for introducing the biscuits into the cartons, Fig. 7 is a plan view of the parts of the machine shown in Fig. 6, Fig. 8 is a horizontal sectional view on the line 8—8 of Fig. 6, showing in plan certain parts for operating the carton-feeding devices, Fig. 9 is a similar view showing the main drive shaft and the mechanism by which the cartons and biscuits are fed, this figure being taken on the line 9—9 of Fig. 6, Fig. 10 is a plan view in detail on an enlarged scale showing the mechanism for feeding the cartons from the stack and opening and advancing the cartons toward the packing station, parts of the mechanism being shown in horizontal section.

Fig. 11 is a perspective view of the parts shown in Fig. 10,

Fig. 12 is a perspective view of portions of the carton feeding mechanism, the biscuit feeding mechanism, and the devices for feeding the paper, Fig. 13 is an enlarged perspective view of parts by which the flaps of the cartons are folded to proper position in the movement of the cartons to the packing station, Fig. 14 is a perspective view similar to Fig. 7, but showing certain parts removed and other parts in operative position, Fig. 15 is a vertical sectional view showing parts for feeding the biscuits taken on the line 15—15 of Fig. 9, Fig. 16 is a front elevation of certain of the parts shown in Fig. 15, taken on the line 16—16 of Fig. 9, Fig. 17 is a vertical sectional view of the end of the main cam drum, taken on the line 17—17 of Fig. 9, Fig. 18 is a vertical sectional view through the bed plate of the cam frame, taken on the line 18—18 of Fig. 8, Fig. 19 is a detail sectional view taken along the line 19—19 of Fig. 8, Fig. 20 is a detail sectional view of a carton feeding device, taken along the line 20—20 of Fig 8, Fig. 21 is a detail vertical sectional view of the carton opening device, taken along the line 21—21 of Fig. 8, Fig. 22 is a detail vertical sectional view of a carton feeding device taken on the line 22—22 of Fig. 8, Fig. 23 is a vertical sectional view, taken on the line 23—23 of Fig. 22.

Fig. 24 is an elevational view of a certain drive mechanism, parts being shown in section and the view being taken on the line 24—24 of Fig. 9, Fig. 25 is a view in elevation of certain drive mechanism, parts being shown in section, the view being taken on the line 25—25 of Fig. 9, Fig. 26 is a vertical sectional view taken on the line 26—26 of Fig. 25, Fig. 27 is a view in front elevation and partly in section of the carton filling devices, taken on the line 27—27 of Fig. 7 and showing the parts in lowered position, Fig. 28 is a horizontal detail view taken on the line 28—28 of Fig. 29, Fig. 29 is a vertical sectional view taken on the line 29—29 of Fig. 28, Fig. 30 is a view similar to Fig. 29 showing the parts in a different position, Fig. 31 is a vertical sectional view, partly in elevation, of the carton filling mechanism, showing the parts in raised position.

Fig. 32 is a similar view with parts broken away showing the parts partially lowered, Fig. 33 is a vertical sectional view, partly in elevation, of one end of the carton filling devices, showing the packing frame about to be raised, Fig. 34 is a horizontal sectional view taken on the line 34—34 of Fig. 27, Fig. 35 is a vertical sectional view taken on the line 35—35 of Fig. 27, Fig 36 is a horizontal sectional view taken on the line 36—36 of Fig. 27.

Fig. 37 is a side view of the carton feeding and filling mechanism taken on the line 37—37 of Fig. 7.

Fig. 38 is a horizontal sectional view on the line 38—38 of Fig. 27,

Fig. 39 is a similar view, showing the parts in different position,

Fig. 40 is a vertical sectional view taken on the line 40—40 of Fig. 38,

Fig. 41 is a detail sectional view taken on the line 41—41 of Fig. 38,

Fig. 42 is a vertical sectional view of the carton spacing mechanism, taken on the line 42—42 of Fig. 37, Fig. 43 is a front elevational view of the biscuit removal mechanism, taken on the line 43—43 of Fig. 7, Fig. 44 is a similar view with parts broken away, Fig. 45 is a vertical sectional view taken on the line 45—45 of Fig. 43, Fig. 46 is a detail sectional view on the line 46—46 of Fig. 45, Fig. 47 is a detail sectional view on the line 47—47 of Fig. 45, Fig. 48 is a perspective view of mechanism for conveying the filled cartons and for folding the flaps thereof, Fig. 49 is a view, partly in elevation and partly in section, taken on the line 49—49 of Fig. 50, Fig. 50 is a transverse vertical sectional view on the line 50—50 of Fig. 49, and Fig. 51 is a detail view showing one of the collapsed cartons folded in the manner in which it is supplied to the machine.

Figure 1:
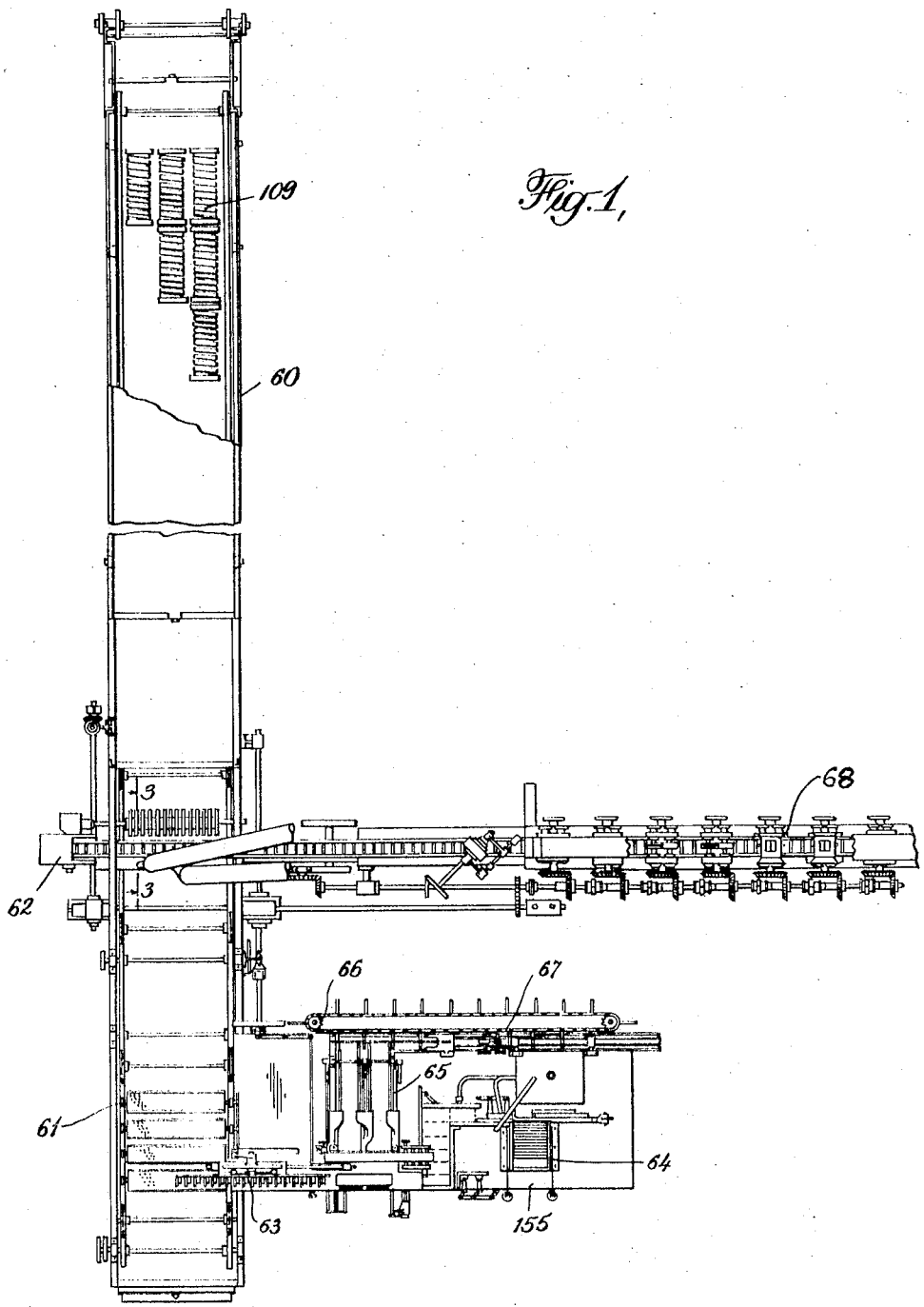

In the drawings, and with reference particularly to Fig. 1, the apparatus is shown as including an oven 60 of considerable length and a conveyor 61 which moves into, through, and out of this oven. The conveyor is provided with transverse pans and at one point in its travel, preferably outside the oven, the conveyor receives unbaked biscuits deposited in rows in the pans by a feeding mechanism, generally designated 62. The conveyor carries the biscuits through the oven and after being baked and dried the biscuits are removed from the pans by a delivery device, generally designated 63. This device has the form of a reciprocating rake and it removes the biscuits from the pans in rows and deposits them upon an inspection platform. The biscuits are moved across this platform in successive steps, and are eventually delivered in two groups of three to a packing station to which cartons are fed from a supply 64 by suitable devices which open the cartons, fold the flaps appropriately, and move the cartons into position to be filled. After the biscuits have been placed in the cartons to the capacity of the latter, the cartons are moved rearwardly along guide-ways 65 to a conveyor 66 which advances the cartons through sealing mechanism 67. After being sealed, the cartons are discharged.

The biscuits are made from cereal grain given a preliminary cooking treatment and then delivered to the hoppers of shredding devices 68 (Fig. 2) which include a pair of rolls which act on the grain and transform it into a plurality of continuous filaments which are deposited upon an endless link belt 69. Several of these shredding devices are employed so that the strand may have the desired thickness. The belt 69 is made up of links 70 and rollers 71 and the upper horizontal stretch on which the strand is deposited runs on tracks 72. Above this stretch of the belt is an upper cutter chain 73 made up of links 75 connected by rollers 76, and the upper stretch of the chain travels over a track 77 and the lower stretch beneath a track 78. The links 75 carry cutter blades 79 and are hollow, as shown at 80 (Fig. 3) their lower faces being covered by wire screens 81. The upper cutter chain is guided so that its lower stretch lies close to the upper horizontal stretch of the conveyor belt and the chain extends a considerable distance beyond the end of the belt. The lower cutter chain made up of links 82 connected by rollers 83, which carry cutter blades 84, lies within the loop of the conveyor belt and its upper stretch is guided over a track 84' in close proximity to the under surface of the belt. The links of the conveyor belt are separated in such manner that the cutter blades 79 and 84 of the two chains pass between the spaces between the links of the conveyor chain and cooperate to divide the strand of filaments carried by the conveyor into a plurality of individual biscuits.

The portion of the upper chain which extends beyond the end of the loop of the conveyor chain serves as a part of the feeding mechanism and disposed within the loop of the upper chain and extending beyond the end of the conveyor chain loop, is a vacuum chamber 85 with which may be associated a compressed air chamber 86. Both chambers have similar lengthwise slots 87 and 88 in their lower walls. Mounted on suitable flanges on the lower walls of the chambers is a slide 89 which carries a series of valve plates 90 arranged lengthwise of the chambers for controlling the flow of air through the slots. These valve plates move in seats in the slide and have openings 91, 92 separated by a solid part 93. By moving the valve plates horizontally, the openings in the plates will open one chamber and close the other. Each plate is actuated by a rocker arm 94 pivoted on a slide 95 extending along the side wall of the chamber 85, and this rocker arm is rocked by a cam 96 on the shaft 97 mounted in brackets on the slide 95. At the side opposite that engaged by the rocker arm, each plate carries a rod 98 encircled by a spring 99 bearing at one end against a part of the plate and at the other against an extension of the slide 89.

It will be seen that the links in the lower horizontal stretch of the upper cutter chain lie close to the lower walls of the chambers, and in the operation of the mechanism the strand carried by the conveyor is first subdivided by the action of the cutter chains into individual biscuits, and as the biscuits pass along on the conveyor chain in contact with the hollow links of the upper cutter chain, at the appropriate instant the valve plates 90 are moved successively by the rocker arms to a position in which the hollow links are placed in communication with the interior of the vacuum chamber 85. The vacuum lifts the biscuits from the conveyor chain and holds them against the lower faces of the hollow links, and as these links pass along beyond the end of the loop of the conveyor chain, a row of biscuits is thus removed therefrom. The chambers 85 and 86 extend out over the baking conveyor 61 and when a group of biscuits held by suction against the faces of the hollow links is sufficient in number to fill a pan, the valve plates 90 are operated simultaneously throughout the length of the chambers to close the vacuum chamber from the links and to put the pressure chamber in communication with the links. This causes the biscuits to be dropped from the links upon one of the pans 100 of the baking conveyor.

The portion of the baking conveyor passing beneath the depositing mechanism moves with a step by step movement, each step of the movement resulting in a pan being placed in position to receive biscuits. When this pan is filled, another pan is brought into position and during this period the upper cutter chain continues to move, the valve plates are again moved one after another to place the links in communication with the suction chamber, and another row of biscuits is removed from the strand conveyor, brought out over the next pan, and deposited therein.

While it is possible to discharge a group of biscuits upon a pan while the pan is moving continuously beneath the feeding mechanism, the depositing taking but an instant, it is preferable to give the pans the step by step movement and to charge each pan in one of the periods of rest of this movement. For this purpose the conveyor construction illustrated in Figs. 4 and 5 is employed. The conveyor is endless and has a portion which lies within the oven chamber, entering the latter near the top of the front wall and leaving through the front wall near the bottom. The conveyor chain is formed of a pair of side chains made up of links 101 connected loosely by transverse rods 102 which carry lugs 103 to which are secured the pans 100. From the ends of the rods 102 depend lugs 104 connected by links 105. These links form a suplementary chain and by moving this chain with reference to the main chain in an appropriate manner, the pans may be maintained upright, regardless of the position of the links 101 with reference to the pans.

The conveyor entering the oven near the top of the latter is led through the oven in a plurality of horizontal stretches, indicated at 106. The top stretch of the conveyor passes to a point near the far end of the oven and is led around a sprocket wheel 107. The conveyor is then led forwardly, passing around another sprocket wheel 108 near the front end of the oven, and a plurality of open loops are thus formed in the conveyor so that the biscuits on the pans traverse the oven a number of times during the baking operation. Within the oven are heating units, generally designated 109 and here illustrated conventionally as electrical heating elements. Other heating means for the oven, however, may be employed. These heating devices are arranged so that the unbaked biscuits entering the oven are exposed to a relatively high temperature and then passing downwardly through the oven, are exposed to decreasing temperatures, so that after the preliminary baking the biscuits are dried.

In view of the great length of the conveyor, it is not desirable to move it as a whole with a step by step movement, but those parts of the conveyor that are to receive the biscuits and from which biscuits are to be removed, I prefer to move intermittently in order to facilitate these operations. For this purpose the portion of the conveyor outside the oven is guided through a depending loop consisting of two vertical stretches connected by a horizontal stretch. This horizontal stretch is moved to and fro in a direction lengthwise of the coveyor, and although the conveyor as a whole is moving continuously, the pans in the horizontal stretch of the loop are moved with a step by step movement. These pans pass beneath the biscuit depositing device and successive pans receive biscuits at each period of rest of the movement. The removal mechanism presently to be described also operates to remove biscuits from the pans while the latter are at rest and it is preferable to lead the conveyor through two loops, one associated with the biscuit depositing device, and the other with the biscuit removal mechanism. This permits the deposition and removal of biscuits from portions of the conveyor moving step by step and affords sufficient room for the two groups of mechanism.

The conveyor chain passing out from the bottom of the oven, is led around sprocket wheels 110, one for each of the side chains of the conveyor, the sprocket wheels being mounted on a shaft 111 in suitable bearings. From the sprocket wheels 110, the conveyor passes upwardly over sprocket wheels 112 mounted on a shaft 113. This shaft is journaled in bearing blocks 114 slidable in suitable guide-ways provided in the framing and moved to maintain the conveyor chain taut by means of springs 115. From the sprocket wheels 112, the conveyor passes down in a vertical stretch 116, then around sprocket wheels 117, mounted in rods 118 pivotally suspended from a bar 119 of the frame. From the sprocket wheels 117, the conveyor passes in a horizontal stretch 120, suitably supported on tracks 121, to sprocket wheels 122 mounted on a shaft carried in the lower ends of similar arms 118. The two sets of arms 118 are connected by a cross member 123. From the sprocket wheels 122, the conveyor extends upwardly to sprocket wheels 124 supported on shafts mounted on the framing, then across to similar sprocket wheels 125 and then downwardly around sprocket wheels 126 supported on a shaft in the lower ends of arms 118. From sprocket wheels 126, the conveyor passes in a horizontal stretch 127 running on a track 128 to sprocket wheels 129 mounted on the shaft on the ends of another pair of arms 118. The conveyor then passes upwardly and around sprocket wheels 130 supported on a shaft journaled in bearings in the framing and from the sprocket wheels 130 the conveyor passes in a horizontal stretch 131 into the oven through an opening in the front wall.

The conveyor led around the sprocket wheels in the manner described, forms two depending loops having horizontal stretches 120 and 127. The arms 118 in each loop are connected by rods 123 and the arms of the two loops are connected by a connection rod 132. Connected to the bearing of the shaft of sprocket wheels 126, is a rod 133 having an adjustable connection with a rock arm 134 pivotally mounted on the bed of the machine at 135. This arm 134 is reciprocated by means of cams 136 mounted on a driven shaft 137.

The conveyor as a whole is driven by means of the sprocket wheels 108 at one end of the oven, which are driven by suitable gearing connections from vertical shafts 138 driven by gearing from a main drive shaft 139, which is in turn driven from any suitable source of power. A horizontal shaft 140 is driven through gearing connections from the vertical shaft 138 and through gearing connections drives the shaft on which sprocket wheels 130 are mounted. A second horizontal shaft 141 is driven through a suitable connection from shaft 140, and this shaft drives the shaft of sprocket wheels 125 and also drives the vertical shaft 142 which drives the shaft 111. A horizontal shaft 143, driven through gearing from the shaft 138, drives a transverse shaft 144 which drives the shaft 137 through suitable connections (not shown). The sprocket wheels 112 and 124, and the sprocket wheels carried in the ends of the depending arms 118, are idlers. The spring take-up for the shaft 113 keeps the conveyor chain taut outside the oven, and similar spring take-ups are employed in connection with the shafts of the sprocket wheels 107.

The conveyor as a whole has a continuous movement, but the portions forming the horizontal stretches of the two loops are reciprocated on their tracks by means of the cams 136 and the rocker levers 134. In each movement of the rock levers in a direction opposite to that in which the conveyor is moving, one link of the conveyor chain in each vertical stretch 116 of the loops is placed by the sprocket wheels 117 and 126 on the tracks 121 and 128, and sprocket wheels 122 and 129 release a link carrying a pan from this horizontal stretch and permit the link to move upwardly. The remaining links of the horizontal stretches remain at rest. When the rock levers 134 reciprocate in the direction in which conveyor chain is moving, the horizontal stretches are advanced by one link. Accordingly, the pans are brought successively to rest in one loop beneath the depositing mechanism 62 and in the other loop beneath the biscuit removal mechanism 63. At each period of rest of the pans, a group of biscuits is deposited in a pan by the depositing mechanism and a group of biscuits is removed from a pan by the biscuit removal mechanism.

In order that the pans may be maintained upright at all times throughout the movement of the conveyor chain, suitable guiding devices are provided for the supplementary chain. One of such devices is illustrated in Fig. 5, where the conveyor chain is shown passing about a sprocket wheel such as 107. On the journal box of the shaft 146 of the sprocket wheels 107 is mounted an eccentric disc 148 and a ring 149 is mounted for rotation on this disc. This ring is provided with seats 150 in its rim and each seat receives the end of a lug 104 as the conveyor chain passes around the sprocket wheels 107. The eccentricity of the disc 148 is such that the lugs 104 are given a movement relative to the links 101 sufficient to maintain the pans in vertical position, even though the links 101 are inverted after their movement around the sprocket wheels 107. Similar guiding devices are employed at each point where the conveyor chain changes direction.

The oven enclosure through which the conveyor chain is led is formed of side walls of suitable insullating material and is provided with a partition 150' dividing the enclosure into an upper shallow baking chamber and a lower deeper drying chamber. Passing out of the oven near the bottom of the front wall through a suitable opening, the conveyor travels through a conduit indicated generally at 151 and provided with a gate 152 at its rear end, by which the ingress of air may be controlled. Additional air may be introduced into the oven through the opening near the top of the front wall through which the conveyor chain enters the oven, and at the rear end of the oven is an air outlet 153 connected to suitable air suction means by which air may be drawn through the openings mentioned and passed completely through the oven from one end to the other. A branch line 154 leads to openings in the top of the oven (not shown) and provides means for removing the moisture-laden air from the oven chamber.

The delivery mechanism (Figs. 6, 7, 43 to 47, inclusive) by which the baked dried biscuits are removed from the conveyor, is disposed opposite the first conveyor loop at the right in Fig. 4, and operates in timed relation to the intermittent movement of the pans in the horizontal stretch of the loop, the biscuits thus being removed from the pans while the latter are temporarily at rest. This device is mounted on the bed plate 155 supported on suitable standards 156, 157. Beneath the bed plate near one end is journaled a main drive shaft 158 driven from any convenient source of power and preferably connected with the drive shaft 139, the shaft 158 carrying a fly wheel 159. The shaft 158 drives the biscuit removal mechanism directly and drives the carton feeding and filling devices through gearing, and the drive is so arranged that by operating a clutch 160 only the biscuit feeding mechanism will continue in operation, the other devices being disconnected from the shaft. This clutch mechanism includes the clutch 160 actuated by a lever 161 pivoted at 162 on the bed plate and controlled from the front of the machine by a rod 163 sliding in a bearing 164. At its forward end the rod has a handle by which it may be manipulated by the attendant.

The delivery mechanism includes upright supports 165 and 166 secured to the bed plate 155 and carrying spaced parallel bars 167 and 168 which are of square cross-section and turned edgewise to resist bearing strain. Upon these bars is slidably mounted the frame consisting of uprights 169 and 170 having passages therein engaging the bars 167 and 168 and connected at their upper ends by a cross piece 171 having an arched handle portion 172. These uprights are connected at their lower ends by a cross piece 173.

Upon the front faces of the uprights 169, 170 are stud bolts 174, 175 upon which are mounted vertical slotted extensions 176, 177 of an elongated plate 178 which is adapted to have a longitudinal movement in unison with the frame and a vertical movement relatively thereto. Within the frame and slidably mounted upon the bars 167, 168, is a slide piece 179 preferably formed of two pieces bolted together and provided at each side of its lower end with adjustably mounted bolts 180, 181, arranged to engage stop lugs 182, 183, upon the cross piece 173 as the slide piece is moved to the right or left. Upon the upright parts of the frame 169, 170 are pivotally mounted bell crank levers 184, 185, the lever 185 being inverted with reference to the lever 184. The arms of the levers are connected to the slide block 179 by links 186, 187, while the long arms are connected by links 188, 189 to the plate 178. As the slide block is moved to the right relative to the slide frame, the bell cranks are moved to lower the plate 178, and when the slide block is moved to the left with reference to the slide frame, the bell cranks are caused to raise the plate 178.

A long stroke lever 190 (Fig. 6) is pivotally mounted to the base at 191 and is connected at its upper end to the slide block 179 by a link 192. This lever is jointed at 193 for adjustment and is connected with the upper end of a lever 194 pivoted to the standard 156 at 195. The lever 194 has a slot 196 engaged with a slide block 197 mounted eccentrically upon a disc 198 which is mounted on the main drive shaft 158. The oscillation of the disc imparts a compounded long swing to the lever 190 and in operation the initial swing to the right slides the block 179, lowering the plate 178 through the rotation of the bell crank levers 184 and 185 until the bolt screw 181 strikes the stop lug 183, the slide block and the frame then moving in unison. On the reverse movement, the block 179 first moves to the left, causing the plate 178 to be lifted, this raising movement continuing until the bolt screw 180 engages the lug 182, whereupon the frame and slide block are moved in unison toward the left.

On the plate 178 is a series of blades which are adapted to engage behind the biscuits and feed them forwardly. The horizontal stretch of the conveyor in the first loop passes beneath the end of the plate 178 and mounted on the bed plate of the machine is an inspection table 199 supported on uprights 200. This inspection table extends close to the ends of pans 100 and in each period of rest in the intermittent movement of the conveyor, one of the pans lies with its end in registry with the platform 199. During such movement the plate 178 has moved out to a position over the pan and at the proper instant the plate is lowered so as to bring the blades close to the surface of the pan, the blades entering the spaces between adjacent biscuits on the pan. The plate 178 now moves in unison with the slide block so that the blades carry the biscuits from the pan to the inspection platform and at each reciprocation of the plate 178, six biscuits are moved from the pan to the platform and twelve biscuits previously deposited on the platform are moved by the blades in successive steps to a position whence they are to be transferred to the packing mechanism. As each pan contains twelve biscuits in a row and the removal device only removes six biscuits, a second removal device removing biscuits from the opposite side of the pan is intended to be used in this machine. This biscuit removal mechanism, and the packing devices associated with it, are the same as those illustrated, but they are merely reversed in operation.

Each of the blades 201 by which the individual biscuits are engaged, each biscuit thus being removed under exact control from the pan and similarly advanced along the platform, is flexibly mounted on a pair of pivotal frames 202, 203 which are supported on shafts 204, 205, mounted in brackets 206 secured to the outer side of the plate 178. The side portions of the frames 202 and 203 are slotted so that the shafts 204 and 205 are slidably mounted therein, coil springs 207, 208 being disposed between the shafts and the cross pieces 209 and 210 of the frames so that pressure in either direction on the blades will move either the upper or lower frame relatively to the shafts compressing the springs. Upon release of the pressure, the blades assume their normal positions. A stop pin 211 engaging the under side of the frame 202, limits the downward movement of the blades, the frame being yieldably held against the pin by a spring 212 which is coiled about the shaft and tensioned through the engagement of its end 213 with the bracket 206. The construction is such that the blade is capable of yielding upwardly, forwardly, and rearwardly so that if a biscuit is in the path of the blade when the blade is moved down, the blades will yield so as not to damage the biscuit.

As the biscuits are moved along the platform 199 in successive steps, they are eventually deposited in front of a feed bar 454. The packing mechanism is arranged to fill two cartons simultaneously, and the biscuits are fed to the cartons in groups of three. The six biscuits deposited in front of the feed bar by the action of the biscuit removal device are equally spaced and as the feed bar reciprocates at right angles to the direction in which the biscuits have been led to it, delivering the biscuits to the packing devices, the biscuits are divided into groups of three by a V-shaped deflector 215.

Figure 10:
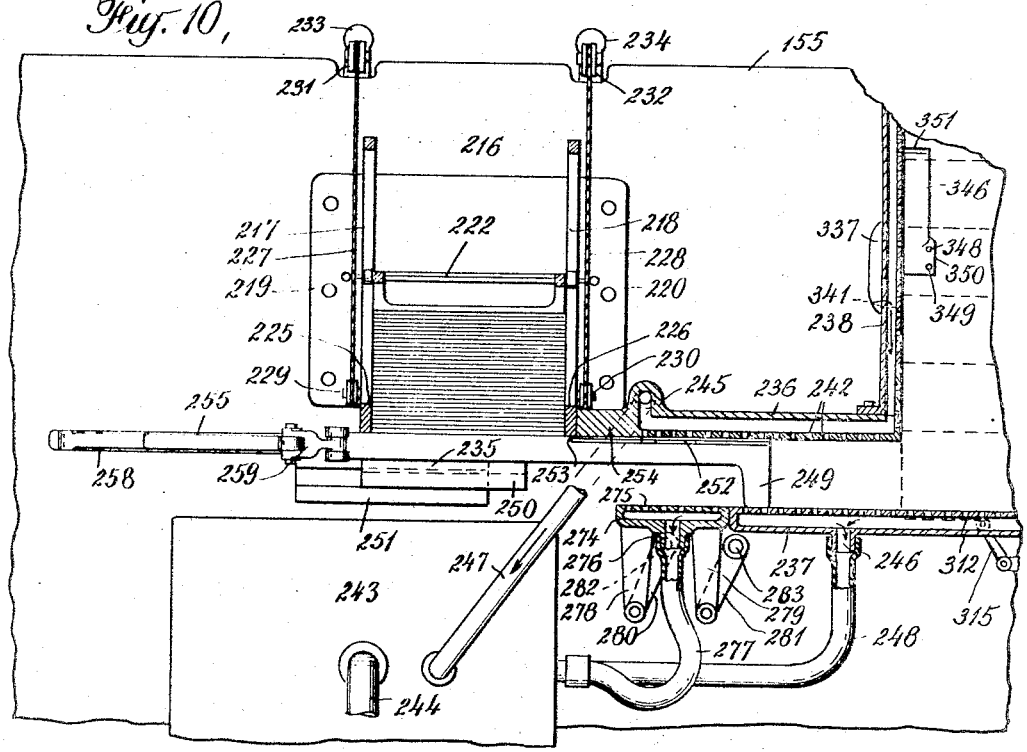
Figure 11:
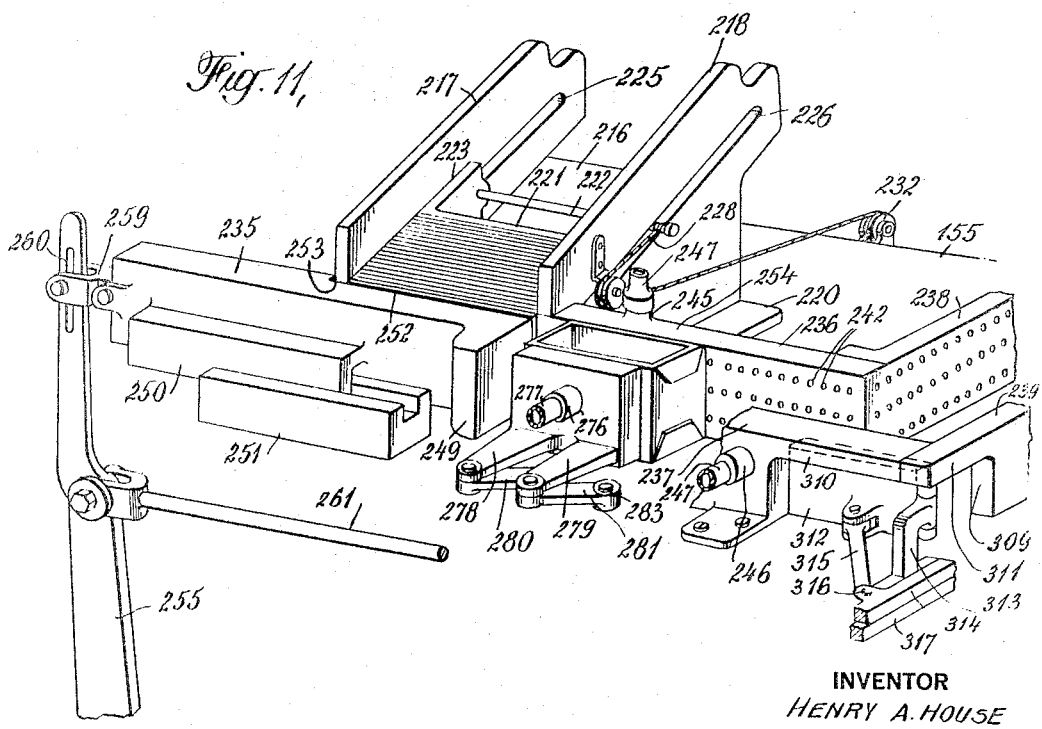

The cartons are supplied from a hopper which comprises an inclined base 216 (Figs. 10 and 11) supported between side plates 217 and 218 secured at their flanged bases 219 and 220 to the bed plate. The cartons are stacked vertically in flattened condition in the hopper, and these cartons have side and end flaps at top and bottom which are turned outwardly so as to lie against the vertical walls of the cartons. A slide follower 221 is mounted in the hopper to force the stack of cartons into the lower end thereof, this hopper having a guide rod 222 which is mounted in the sides 223 and 224 of the hopper and projects through slots 225, 226 in the side plates. To the ends of the rod are connected cords 227, 228, which extend over guide rolls 229, 230, 231, 232 and carry weights 233 and 234, at their lower ends. These weights force the follower against the stack of cartons.

The front end of the hopper is normally closed by a sliding feed member 235 and extending from the hopper at one side along the feed plate is a guide-way having a hollow wall 236 at one side. Its inner surface is substantially flush with the lower end of the hopper and the other wall 237 of the guide-way is also hollow and is spaced from the wall 236 a distance equal to the width of an opened carton. This longitudinally extending guide-way communicates at its end with a guide-way extending forwardly therefrom and at right angles, this guide-way having a width corresponding to the length of an opened carton and being bounded by hollow walls 238, 239. This guide-way in turn communicates with a third guide-way extending at right angles thereto and parallel to the first guide-way, being bounded by hollow walls 240, 241.

These several hollow walls are suitably secured together by air-tight connections and the spaces between the contacting walls are in communication. The inner surfaces of the walls are perforated as indicated at 242 and a partial vacuum is maintained within the walls by means of a suction chamber 243 connected to an air exhaust by a pipe 244 and to flanged outlets 245, 246 of the walls 236 and 237 by pipes 247 and 248. The suction walls exert a grip on the side walls of the cartons, tending to maintain them in opened condition. The guide-ways are arranged in the manner described so that the cartons may be conveniently fed one by one from a hopper, opened and delivered in single file with their ends in contact to a position in front of the packing devices where the two end cartons are moved abreast to the packing station. In the movement of the cartons from the hopper to the packing station, the bottom end flaps of the cartons must be turned inwardly and this is conveniently done by feeding the cartons at one point along a guide-way through which the cartons move with their sides uppermost, folding devices acting on the bottom end flaps in this movement and turning them inwardly.

The reciprocating feed member 235 moves to and fro in front of the hopper and at its forward end carries a pusher head 249 which is guided in its movement by means of an angle flange 250 projecting at one side and engaging a slotted guide block 251 fixed to the bed plate. The inner face of the slide member is provided with a recess 252 having a shoulder 253 at the end of the recess. As the slide member moves across the end of the hopper, the shoulder picks up a flattened carton and moves it forwardly into engagement with the inner surface of the wall 236, and as the slide member retracts, the flattened carton remains in contact with the surface of the wall, being held there by the suction. The part 254 of the wall adjacent the hopper is solid and unperforated, this part having a length corresponding substantially to the width of the end of a carton. The carton fed by the slide feed member and deposited against the inner surface of the wall 236, is gripped along its side by the suction action, while its end opposite the unperforated part of the wall is free.

The slide feed member 235 is reciprocated by means of a lever 255 pivotally mounted at 256 on an extension 257 of the base of standard 157, the lever extending upwardly through a slot 258 in the bed plate and being connected to a forked link 259 adjustably secured in a slot 260 in the lever. A connecting rod 261 extends from the lever 255 to a lever 262 pivotally mounted at its lower end 263 upon standard 156 and provided on its upper end with an enlarged head having parallel slots 264, 265, the slot 264 being relatively wide and having its axis coincident with the axis of rotation of the lever, while the narrower slot 265 is offset and is pivotally connected to the end of the rod 261 by an adjustable connection 266. The slot 264 receives an eccentric crank pin 267 slidable therein, this pin being mounted on a disc 268 secured to the end of an auxiliary drive shaft 269 journaled in the frame and driven by the main shaft 158 by gears 270 and 271 (Fig. 9) and an intermediate gear 272 mounted on a stud shaft 273. The gear ratio is such that the shaft 269 is rotated once for each two rotations of the shaft 158. Thus, for each four rotations of the main drive shaft, two cartons are fed from the hopper. The gear 270 is loose upon the shaft 158 and is connected thereto through the operation of the clutch 160 so that upon occasion the shaft 158 may rotate without driving the gear 270.

At the end of the wall 237 and substantially diagonal with reference to the solid portion 254 of the wall 236, there is disposed a swinging suction head 274 (Figs. 8, 10, 11, 21) which is hollow and has perforations 275 in its front face. Its rear face has a flanged outlet 276 connected by flexible pipe 277 to the suction chamber 243. Near its base the head has projecting arms 278, 279 which are pivotally connected to the ends of the crank arms 280, 281 mounted on the upper ends of shafts 282, 283 journaled in the bed plate and carrying crank arms 284, 285 on the lower ends beneath the bed plate. A third crank arm 286 is mounted upon a stud shaft 287 below the bed plate and the ends of the three arms 284, 285, and 286 are connected by a bar 288 so that they will operate in unison.

The bar 288 is swung to and fro transversely of the bed plate to oscillate the crank arms by means of a lever arm 289 to which it is connected by a link 290, adjustably and pivotally connected at one end 291 in a slot 292 in the end of the lever 289 and pivotally connected at its other end to the bar 288. The lever 289 is pivotally connected at 293 to the under side of the bed plate and is provided intermediate its ends with a roller 294 sliding in a cam groove 295 of a cam plate 296 mounted on the reciprocating cam supporting frame comprising rails 297 and 298 (Figs. 8, 18) connected at their rear ends to a dove-tailed slide bar 299 which is slidably mounted in beveled guides 300 and 301. The forward ends of the rails are connected by a plate 302 which has a forwardly extending arm 303 slidably mounted in dove-tailed guides 304 and 305 secured to the under side of the bed plate. An intermediate cross piece 306 also connects the two side rails, a lug 307 formed on its under surface being connected by a link 308 to the lever 255 so that the lever in its oscillation reciprocates the cam frame.

The cam groove 295 of the plate 296 is so arranged that as the lever 255 and the cam frame are moved in a direction to withdraw the slide feed member 235, the lever 289 is swung forwardly from the position shown in Fig. 3. In such movement the head 274 is swung to the full line position shown in Fig. 7 and it contacts with the inner wall of a carton which has been fed by the sliding head. As the cam frame moves in the opposite direction, the head is swung back to its original position and swings the carton open. As the slide feed member 235 again moves forwardly, feeding a flattened carton, its head 249 engages the opened carton and pushes it forward in the guide-way, together with the carton previously opened.

At the corner formed by the meeting ends of the side walls 237 and 239 there is an opening 309 (Figs. 11, 22) bridged over by the reduced ends 310 and 311 of the side walls. Within this opening is a pusher head 312 which is adapted to receive cartons pushed forwardly by the head 235 and to advance these cartons along the guide-way between the walls 238 and 239. The head 312 is mounted at one end upon a bracket 313 which is mounted on the slide rod 314 and the head is connected at its rear face by a link 315 to a post 316 mounted on a slide rod 317 disposed beneath the rod 314 and arranged for movement relative thereto. The bracket 313 and the post 316 extend upwardly through a slot 318 in the bed plate (Fig. 22) and the slide rods are moved in a channeled guide 319 secured to the under side of the bed plate and provided with retaining strips 320, 321, projecting over the channel to hold the rods therein. The rod 314 has a slot 322 formed in it into which enters a pin 323 mounted on the rod 317. The pin 323 is arranged so that when rod 317 is moved in either direction, it first moves relatively to rod 314, then the two move in unison.

The forward movement of the slide member 235 advances a carton beyond the corner formed by the walls 236 and 238 and as the carton advances, the head 312 is being withdrawn and rod 317 first moves relatively to the rod 314 so as to swing the head 312 out of the path of the advancing cartons. On the continued rearward movement of the rod 317, the two rods 314 and 317 move together until the outer swinging end of the head engages the wall 237, whereupon the further movement of the rod 317 causes a slight forward movement of the pin in the slot, resulting in the head 312 being straightened and aligned with the inner surface of the wall 237.

The rear end of the rod 317 is connected to a link 324 (Fig. 8) adjustably and pivotally connected at its end to the slotted end 325 of a lever 326 pivotally mounted at its opposite end 327 on a convenient part of the machine frame. The lever 326 carries a cam roller 328 lying within a cam groove 329 in a cam plate 330 carried on the reciprocating cam frame. This cam groove forms a closed path for the roller and within the cam groove are leaf springs 331 and 332, one end of each of which is embedded flush with the surface of the groove (Fig. 19) while the free ends of the leaf springs are forced upwardly by coil springs 333 in sockets 334. In the reciprocation of the cam frame, the ends of the leaf springs projecting into the cam groove prevent the return movement of the roller along the same path, and insure that the roller will travel in such a way as to swing the lever 326 to advance and retract the rod 317 and with it the head 312.

As the cartons are fed between the walls 238 and 239, their bottom end flaps are turned inwardly partially to close the bottoms of the cartons, by means of flap-folding devices disposed at each side of the guide-way. These devices comprise shoes 335, 336 (Figs. 12, 13) which are mounted above openings 337 and 338 in the bed plate and have bracket lugs 339 secured to the bed plate by screws 340. The shoes extend upwardly into elongated openings 341 and 342 formed in the walls 238 and 239 respectively, the opening 341 being relatively higher and extending forwardly to the end of the wall 240 to accommodate a carton feeding head presently to be described. The front end of each shoe is provided with a beveled nose portion 343 and at the under side each shoe has a depending turning flap 344 which terminates at one end rearwardly of the nose of the shoe, its beveled edge 345 being substantially a continuation thereof. The flange is bent inwardly beneath the plate 346 which extends over an opening 347 of the bed plate. The plate 346 is flush with the surface of the bed plate and is held in position by screws 348 and 349 which enter a projecting portion 350 of the bed plate, the plate 346 extending rearwardly of the end of the shoe and having its end spaced from the beveled end 351 of the opening 347 to form an outlet slot for the turned end flap. As the cartons move forwardly, the nose portions 343 of the shoes enter between the up-turned end flaps, turn them outwardly along the edges 345 of the flanges to the folded-in position between flanges 344 and plates 347, the inwardly turned flaps then moving out through the slots to the ends of the plates 346.

The cartons advanced to the ends of the guideway defined by walls 238 and 239, are now fed at right angles thereto between walls 240 and 241. The mechanism by which the cartons are advanced in the new direction includes spaced lugs 352, 353, 354, (Fig. 14) on a flange 355 at the forward end of the arm 303 of plate 302. In these lugs are journaled the shafts 356, 357, and 358 to which are secured crank arms 359, 360 and 361, connected at their outer ends by a bar 362. To the upper ends of the shafts 357 and 358 are secured lever arms 363, 364 on which there is pivotally mounted a pusher head 365 disposed in the opening 341 of the wall 238 and adapted to move through a communicating opening 366 (Fig. 12) provided in the wall 240. A link 367 is pivotally connected to one end of the bar 362 and at its other end is connected pivotally to the slotted end of a lever arm 368 pivotally mounted at 369 on the plate 302. A roller 370 carried on an extension of the arm enters an opening 371 in the plate 302 and cooperates with a cam projection 372 provided on a stationary plate secured beneath the bed plate of the machine.

The cam projection 372 cooperates with the wall of the opening to form a closed path of travel for the roller 370 and a leaf spring 373 secured at one end and having its other end forced upwardly by a coil spring 374 disposed beneath it, lies in the path of travel of the roller, so that as the cam slide reciprocates, the roller is forced to pass around opposite sides of the cam projection in its forward and return movement. On the shaft 357 is a coil spring 375 which tends to force the crank arms in a clockwise direction and through the linkage the lever 368 is yieldingly forced to one side so that the roller in one movement bears against the wall of the opening 371, and in the other against the rounded surface of the cam projection.

In the operation of the mechanism, as the cam frame and plate move to the left (Fig. 8) the roller rides along the straight side of the cam and the pusher head 365 engages the end of a carton and pushes the carton, and two other cartons in front of it, forwardly between walls 240 and 241. In the return movement of the frame and plate, the roller passes along the rounded surface of the cam, causing the lever 368 to swing and this movement, through the linkage, moves the pusher head out of the guide-way as indicated in dotted lines in Fig. 7, so that its longitudinal face is flush with the inner surface of the wall 240 and the guide-way is free to receive another carton from the communicating guide-way. When the cam frame reaches the end of its return movement, the lever again assumes the position shown in Fig. 8, and the pusher head is swung into feeding position.

The cartons moving along the guide-way defined by walls 240 and 241 have their end walls in contact. The packing stations at which the two end cartons are to be filled are separated, so that the cartons must similarly be spaced before being advanced to the packing stations. For this purpose there is a hollow suction head 376 at the end of the guide-way having perforations 377 in the front face, the head being connected by a pipe 378 to the suction chamber 243. The head normally lies in such a position that the feeding movement of the head 365 causes a carton to be advanced into contact with the suction head, the end wall of the carton being gripped by the suction face of the head. Secured to the rear of the head is a rod 379 projecting through a guide block 380 and the head is held normally in advanced position by a coil spring 381 encircling the rod. The end of the rod is bent downwardly at 382 through a slot 383 in the bed plate and lies in the path of a pin 384 on a disc 385 on a shaft 386. As the shaft is rotated, the pin moves the head from full line to dotted line position (Fig. 42), drawing the end carton away from the one next to it by the desired amount.

The shaft 386 is journaled in suitable bearings on the under side of the bed plate and at one end carries a gear 387 meshing with a gear 388 on the end of the shaft 389 journaled in suitable bearings and driven intermittently from the shaft 269 by gears 390 and 391, one of these gears having blank sections, as shown in Fig. 9. The shaft 386 makes one rotation for each two rotations of the shaft 269.

The two end cartons in the guide-way defined by walls 240 and 241, separated by the mechanism described, are now pushed forwardly to the packing stations along spaced guide-ways formed by outer guide walls 392 and 393 and a central guide wall 394. The cartons are fed by means of a pusher plate 395 having top and bottom edge flanges 396 and 397. This pusher plate normally lies within a recess 398 in the wall 240, so that the cartons can be advanced to a position in front of it. The wall at this point is of skeleton form.

The pusher plate is provided with feeding arms 399 and 400 which extend through a suitable opening in the wall, the arm 399 being pivotally secured to one end of the pusher plate, and the arm 400 being similarly connected to the plate intermediate its ends. The arm 400 is secured at one end to the end of a slide bar 401 (Fig. 26) reciprocating in a guide 402, and on the upper surface of the bar 401 slides a second bar 403 connected to bar 401 by a slot and pin connection 404, 405. The arm 399 is connected to the outer end of the bar 403 and when the bar 401 is reciprocated to the right (Fig. 26) the bars are moved together so that the plate 395 engages a pair of cartons which lie in a line and advances these cartons abreast in the separate guide-ways to the packing station. Upon the reverse movement of the bar 401, it moves independently of the bar 403 for a distance corresponding to the length of the slot, so that the plate is swung about the end connected to arm 399 as a center. Its free end is thus retracted in advance of the connected end, moving out of the way of the cartons being advanced to a position in front of the plate, the plate being swung to normal position at the end of its retractile movement.

The end of the bar 401 is flexibly connected by a link 406 to the slotted end 407 of a lever 408, this lever cooperating with a cam groove 409 of the barrel cam 410 and having latch mechanism, presently to be described, by which the lever is rendered inoperative throughout certain rotations of the cam.

The barrel cam 410 is mounted loosely on the main shaft 158 and is driven therefrom by the countershaft 269 through a gear 411 secured to the shaft 269, an intermediate gear 412 journaled on the stud shaft 413, and a gear 414 secured to the end of the cam. The lever 408 is pivotally mounted upon a stud shaft 415 (Figs. 15, 16) having a rotatable bushing 416 at its lower end in the cam groove 409. Between the bushing and the lever is pivotally mounted on the stud shaft the end of a rock lever 417 having a hub end 418 pivotally journaled upon a vertical shaft 419 suspended from the bed plate. On the end of the lever 408 is an arcuate head 420 which slidably engages an enlargement 421 of lever 417 below a retaining arm 422, projecting from the hub 418. On the lower end of the shaft 419 and between the flange 423 and a head 424 on the extremity of the shaft is pivoted a lever 425 held in position against flange 423 by a coil spring 426. The lever carries a locking pin 427 which extends through a passage 428 in the enlargement 421 of lever 417 and in its upper position (Fig. 15) the pin projects into a socket 429 in the arcuate head 420 and thus locks the levers 408 and 417 together.

On the hub of lever 425 are upper and lower flanges 430 and 431 engaged by trunnion pins 432 in the forked end of a lever arm 433 secured on a horizontal rock shaft 434 supported in suitable brackets upon the bed plate. A rock lever 435 is secured upon the shaft and at its end carries a roller 436 which rides upon the surface of a cam 437 on a shaft 438 supported in suitable bracket bearings and driven by the shaft 158 by suitable gearing. The gearing is so arranged that the cam has one rotation for every four rotations of the shaft 158, and this cam is so formed that during three-quarters of the rotation of the cam the arm 435 depresses the lever 425, thus releasing the levers 408 and 417. When thus released, the lever 408 is oscillated about its pivotal connection to the bar 401 by the action of the cam, but causes no movement of the bar. At the same time the lever 417 is swung about its shaft 419. During the remaining quarter turn of cam 437, the two levers are locked together and are thus rocked as a unit by the cam 410. This rocking movement causes a movement of the lever 401 and the cartons are moved into position to be filled, by head 395.

The packing mechanism as illustrated is arranged to pack two cartons simultaneously, each carton receiving twelve biscuits arranged in four layers of three biscuits each, with a strip of paper inserted between adjacent layers. The biscuit feeding mechanism is actuated by the barrel cam 410 which has a cam groove 439 engaged by a bushing 440 on a lever arm 441 pivotally mounted on the bed plate at 442 and connected at its other end by a link 443 to a slide bar 444 mounted to reciprocate in a guide-way 445 (Figs. 9, 25) secured to the under side of the bed plate. At its forward end the bar 444 has an offset portion 446 (Figs. 9, 12) in which is journaled an elongated shaft 447, the offset portion 446 also having an upstanding arm 448 which, at its upper end, is provided with a sleeve 449 in which is housed a shaft 450 carrying a rocker arm 451 connected by a rod 452 to a rock lever 453 on the end of the shaft 447. Upon the inner end of the shaft 450 is mounted a feed bar 454 which rests upon a plate 199 upon which the biscuits are fed by the removal mechanism in groups of six.

The biscuits are deposited by this removal mechanism in front of the bar 454 which feeds the biscuits forwardly into openings 455 and 456 above the cartons to be filled. In the plate 199 is a glass insert plate 457 so that the position of the cartons beneath the plate may be observed. On the front face of the bar 454 are mounted plates 458, 459, carried on springs 460, these plates engaging the biscuits lightly and moving them forward as the plate advances.

The shaft 447 is slidable in a bracket 461, depending from the bed plate, and is connected to the bar 444 to reciprocate therewith by means of an arm 462 extending from the bar 444 and having a portion through which the shaft extends, retaining collars 463 on the shaft being placed on either side of the arm. At its inner end the shaft is provided with a gear 464 having a spline entering an elongated slot 465 in the shaft 309, this connection permitting the movement of the shaft lengthwise with reference to the gear but connecting the two rigidly for rotation. The gear 464 is intermittently rotated by means of a segmental gear 466 carried on a shaft 467 mounted in suitable bearings beneath the bed plate of the machine and continuously rotated by means of a sprocket gear 468 and a sprocket chain 469 from a sprocket gear 470 on the shaft 269.

When the biscuit feeding bar 454 reaches the end of its feeding movement, the gear 466 meshes with the gear 464 and turns it through a partial rotation. This causes a movement of the rock arms 451 and 453, resulting in the feed bar being swung upwardly about the shaft 450 as a pivot. The feed bar remains raised until it returns to its retracted position, whereupon the segmental gear 466 is disengaged from the gear 464 and the feeding bar is permitted to drop back into its lowered position. The raising of the bar permits the next group of biscuits to be fed into place before the feeding bar has been fully retracted, and as the feeding bar thus moves forward and backward, biscuits are placed in position to be fed during the backward movement of the bar and these biscuits are advanced to the packing station in the forward movement of the bar.

The cartons fed forwardly in the separate guide-ways by means of the pusher plate 395 are supported on a floor plate 471 having openings 472 and 473. When the cartons are in position, a collapsible platform is projected through each opening into the carton, expanding near the top of its upward movement to provide a support for a layer of biscuits. As each layer of biscuits is received by the platform, the latter is lowered by a step, the operations continuing until the carton is filled. In the last step in the downward movement of the platform it is collapsed and withdrawn from the bottom of the carton and the filled carton is then ejected from the packing position by suitable mechanism.

The packing mechanism, (Figs. 27-36) includes a shelf 474 suspended below the bed plate 471 by tubular posts 475, 476, 477, 478, and a frame 479 provided with apertured corner pieces 480 through which the posts extend, is mounted for sliding movement on the posts. On the under side of the frame are secured downwardly extending posts 481, 482, connected at their lower ends to arms 483, 484 of a piston rod 485 connected to the piston head 486 slidable in a suction cylinder 487 supported from the shelf 474 by hanger rods 488 and having a connection at its upper end to a vacuum chamber by a pipe 489. The suction above the piston tends to move it upwardly at all times to raise the frame to its uppermost position.

At the ends of the frame are racks 490, 491, having four teeth engageable by pawls 492 carried on vertically reciprocating shafts 493 and 494 mounted in sleeves 495 and 496, these sleeves being mounted for vertical movement relative to the shafts. Guide collars 497 on the plate 471 support the upper ends of the sleeves, while the lower ends slide in apertures 498 of the shelf 474. Each pawl 492 is pivotally mounted in an opening 499 of the shaft and a leaf spring 500 normally forces it through a slot 501, in the sleeve to a position in which it engages the rack.

The lower ends of the shafts 493 and 494 project beyond the ends of the sleeves and are connected to the ends of a cross beam 502 having a central roller 503 which is engaged by a cam 504 on a shaft 505 journaled in suitable bearing brackets 506 and driven from the main shaft 269 by sprocket gears 507 and 508 and a sprocket chain 509.

The upper ends of the shafts extend above the plate 471 and are provided with shoulders 510 against which bear helical expansion springs 511, bearing at their other ends against the plate and exerting a lifting force on the shafts which retain the roller 503 in engagement with its cam. The rotation of the cam causes the intermittent raising and lowering of the shafts and the pawls successively engage the racks to force the frame downwardly one tooth of the rack at a step.

The posts 475, etc., are provided longitudinally on their outer sides with a series of openings 512 having the form of teeth, and within each of the posts is a slide bar 513 having a groove 514 in which are mounted spaced blocks 515 provided with projecting teeth portions 516 oppositely inclined to the teeth 512. Each bar is arranged to be moved upwardly relatively to the posts by a suitable mechanism so that the teeth 516 are brought into such relation to the teeth 512 that a substantially unbroken outer surface on the posts is provided. When the strips are lowered the teeth are separated so as to form recesses which may be engaged by pawls 517 in slots 518 in corner blocks 480, the pawls being held yieldably in position by leaf springs 519.

The ends of the rods 513 extend below the shelf 474 and are connected in pairs by bars 520 and 521 secured to the rods by setscrews. Rock shafts 522 and 523 mounted in suitable bearings depending from the shelf 474 carry yoke members 524 and 525 which embrace the sleeves 495 and 496 and have slots 526 in their arms which engage trunnion pins 527 provided on the ends of the sleeves. At the outer sides of the bearings the rock shafts carry yoke members 528 and 529, each comprising side arms and a connecting bar, the connecting bars engaging the bars 520 and 521 from beneath. At one end of each rock shaft is a lever arm 530 and 531, these arms being connected by links 532 and 533 to the arms of a rock lever 534 on the end of a shaft 535 mounted in suitable bearings. At the end of the shaft 535 is a lever 536 connected by a link 537 to one end of a lever 538 suitably journaled in a bracket depending from the bed plate. The end of the lever 538 enters a cam slot 539 provided in the end of the slide bar 401 (Figs. 25, 26).

In the operation of the mechanism for raising and lowering the frame, when the frame is in its uppermost position the pawls 492 engage the lowermost teeth of the racks 490 and 491 and as the cam 504 rotates, the shafts 493 and 494 are reciprocated, causing the pawls to move the racks downwardly by the amount of one tooth at each reciprocation. At each step in the downward movement of the frame, the latter is held against return upward movement after it is released by the pawls by means of the pawls 517 entering the teeth 512. The frame is thus moved downwardly with an intermittent movement of four steps, and when it reaches the end of its downward movement it is restored to its uppermost position in a single step. To permit such movement, the lever 538 is swung by the cam slot, and through the linkage rocks lever arms 530 and 531, which raise the cross bars 520 and 521 and with them the shafts 513, thus raising the toothed blocks 515 from the position shown in Fig. 30 to that shown in Fig. 29, the pawls 517 being forced out of engagement with the teeth. At the same time the yoke members 524 and 525 swing downwardly, drawing the tubular posts 495 and 496 downwardly so that the upper ends of each slot 501 forces the pawl 492 into the opening 499 collapsing spring 500 and thereby releasing the frame (Fig. 33). The frame is now free to move upwardly and is so moved by the action of the suction cylinder.

The frame 479 (Fig. 27) carries a pair of collapsible platforms which are of similar construction, so that but one need be described. Each platform comprises telescoping plates 540 and 541, the plate 540 having side flanges 542 which embrace the side edges of the plate 541. The plates are supported on upright arms 543 pivotally connected at their lower ends at 544 to the frame and at their upper ends to the under sides of the plates at 545. Two of the arms are connected to the outer end of each plate, and one of the arms is connected centrally at the inner end of the lower plate, this latter arm preventing the tilting of the plates in their collapsing or expanding movements. Slots 546, 547, are formed in the plate 541 to permit the plate to be moved together to the collapsed position. A cross bar 548 connects the arms supporting one plate of one of the platforms and a link 549 connects this cross bar to a cross bar 550 connecting similar arms supporting the same plate of the other platform (Fig. 27). The other pair of arms of the first platform are connected by a cross bar 551 connected by a link 552 to the end of a link 553, the other end of which is connected to a cross bar 554 connecting the other pair of arms of the second platform.

A transverse shaft 555 mounted in the frame carries a bell crank lever having three arms. Arm 556 is connected with the link 549, arm 557 is connected to the connection between links 552 and 553, and arm 558 carries a roller 559 which lies between the ends of vertical stop posts 560 and 561 provided on the plate 471 and the platform 474, post 561 projecting through an opening in the base of the frame in the lowered position of the latter.

As the frame is raised to its upper position, the roller 559 strikes the post 560 (Fig. 31) and the bell crank lever is rocked clockwise. Through the linkage this causes the arm supporting the plates of the two platforms to swing and move the plates to expand the platforms. When the frame is lowered step by step the roller eventually strikes the lower post, rocking the bell crank in the opposite direction and causing the platforms to be collapsed so as to pass through the openings in the plate 471. When the platforms have thus been moved out of the lower ends of the cartons, the latter are completely filled and feeding mechanism is operated to remove the filled cartons and bring empty cartons into position. When this occurs, the cam 539 through the mechanism described, releases the frame and the latter is drawn to its upper position by the action of the suction cylinder, the platforms entering the cartons and expanding to form surfaces to receive biscuits.

Above the cartons in position to be filled is a vertically reciprocating bar 562 provided with a series of curved plates 563 which are arranged to engage the separate biscuits and to hold these biscuits against movement when the platforms lower the biscuits into the cartons. The bar 563 is supported at its ends on end blocks 564 and 565 which are carried on the upper ends of the vertical slide rods 566 which are guided through projecting portions 567 of the walls 392 and 393 and are connected beneath these portions by cross pieces 568.

At the upper ends of the shaft 493 and 494 (Fig. 37) there are reduced extensions 569 which project through openings centrally of the cross pieces and provided at their upper ends with enlargements between which and the cross pieces are helical expansion springs 570. As the shafts move downwardly to lower the frame step by step, the connection of the frame with the cross bar 526 permits the latter to partake of the initial downward movement, but the shafts continue their down stroke after the bar is stopped by abutment of the stops 571 against the upper surfaces of the walls 392 and 393.

The layers of biscuits within the cartons are separated by strips of paper which are placed in the cartons beneath each layer of biscuits, the proper length of paper being cut as each layer is fed downwardly. The paper feeding mechanism includes supporting standards 572 and 573 (Figs. 25, 27), at the sides of the walls 392 and 393.

Guide rollers 574 and 575 are mounted on suitable shafts on the standard 572 and rollers 576 and 577 are similarly mounted on standard 573. A strip of paper drawn from a supply roller 578 on standard 572 is fed between rollers 574 and 575 and another supply roll 579 is mounted on this standard, from which the strip is drawn around a guide roller 580 in the upper end of standard 573 and thence downwardly between rollers 576 and 577. The rollers 575 and 577 are intermittently operated to feed the proper lengths of paper by sprocket connections with the intermittently rotated shaft 389 (Fig. 25) the connections consisting of a sprocket pinion 581 secured to the shaft of roller 575 which is connected by a sprocket chain 582 to a sprocket gear 583 on a shaft 584 mounted below the bed plate and a sprocket pinion 585 on the shaft of roller 577 connected by a chain 586 to a sprocket gear 587 on the shaft 389. The shaft 584 is driven in correspondence with shaft 389 by a sprocket chain 588, extending around sprocket gears 589, 590 on the respective shafts. The feed rolls draw paper from the supply rolls and feed the paper across the tops of the cartons being packed. When strips of the desired length have been drawn from the supply, these strips are severed by means of knife blades 591 and 592 secured on the inner sides of the end blocks 564 and 565 and cooperating with the inner edges of the walls 392 and 393.

When the cartons are filled they are moved forwardly through the guide-ways formed by walls 392, 393, and 394, to permit empty cartons to be fed to filling position, and the filled cartons are moved by ejecting mechanism so that their weight will not cause the collapse of the cartons advancing to be filled. The walls 392, 393, and 394 are slotted (Fig. 37) and in these slots are reciprocating feed bars, generally designated 593. The bars are of similar construction. On the outer side of the wall 392 is pivotally mounted a lever arm 594 connected by a link 595 to the bar 401 and connected intermediate its ends by a tie rod 596 to a lever 597 pivotally mounted on a bracket 598 extending downwardly from the bed plate of the machine. The upper end of the lever 597 is connected to the jointed ends of links 599 and 600, the link 599 being connected to the end of a feed bar 593, while the link 600 is connected to the lower end of a lever 601 secured to a rock shaft 602 journaled in suitable brackets on the upper surfaces of the walls of the guide-ways and extending across them. At its other end the rock shaft is provided with a lever arm 603 connected by a link 604 to another of the bars 593 and intermediate its ends it is provided with a lever arm 605 which extends downwardly in an opening 606 of the wall 394 and is connected by a link 607 to the other bars 593. Thus as the bar 401 is reciprocated to feed empty cartons to filling position, the bar, through the linkage described, causes a reciprocation of the feed bars 593.

The construction of these bars is illustrated in Figs. 38–41. Each bar is made up of two parts 608 and 609 which have a limited relative movement through the pin and slot connection 610 and 611. As the part 608 is positively reciprocated in one direction or the other, it has a limited initial movement independently of the other part 609, but thereafter the two parts move as one. The part 609 has a series of openings 612 in each of which is a finger 613 pivotally mounted at its forward end upon a pin 614 and at its rear end having a tooth 615 of such size that it may be drawn entirely into the opening when the finger is swung on its pin. Each finger 613 is connected to the part 608 by a link 616 in a slot 617 of the part 608 and pivotally mounted on a pin 618.

As the part 608 is reciprocated rearwardly to feed cartons, its initial movement independent of part 609 forces the fingers out of the openings 612, so that the teeth of the fingers engage one of the cartons. The continued movement of the two parts of the bar in unison then causes the cartons to be fed to the rear, the bar 395 at the same time feeding the empty cartons into position to be filled through the reciprocation of the bar 401. In the reverse movement of the part 608 its initial movement relative to the part 609 causes the fingers to be withdrawn into the pockets, where they are held until the forward movement again begins.

As the cartons are fed to the rear by the ejecting mechanism, their upper end flaps are turned inwardly over the tops of the cartons by folding devices 619, 620, 621, 622 (Figs. 7, 27) these devices being so shaped as to enter between the flaps which are folded down against the ends of the cartons and to turn the flaps inwardly over the upper ends of the cartons, where the flaps are held thereafter by holding-down wires 623. The intermediate folding devices 620 and 621 are combined, as shown in Fig. 7 and the folder 621 is placed in front of the folder 620 so that the flaps of the cartons in the right-hand guide-way will be folded before the flaps of the cartons in the left-hand guide-way, thus preventing intereference between the flaps in the folding operation.

The cartons fed through the guide-ways from the packing station are received upon a longitudinal platform 624 (Fig. 48) mounted upon supports 625 and provided with guide flanges 626 and 627 which extend along the edges of the platform for a portion of its length to retain the lower side flaps of the cartons folded upwardly. An endless conveyor chain 628 running around sprocket wheels 629, 630, carries spaced arms 631 which are moved over the platform 624 with a step by step movement, so that as two cartons are moved upon the platform a feeding arm engages these cartons and moves them along the platform, the extent of the movement being sufficient to permit the next pair of cartons to be moved to position during the period of movement of the chain. The chain is driven from the shaft 269 by means of an intermittent spur gear 632 which meshes with a pinion 633 upon the shaft of sprocket 629 and is mounted upon a vertically disposed shaft 634 which is provided with beveled pinion 635 meshing with a beveled gear 636 on the end of the shaft 269.

Beyond the flanges 626 and 627 the platform is provided with a raised extension 637 (Fig. 48) overlying the end of a longitudinal platform 638 and slightly spaced therefrom, as indicated at 639. As the cartons are fed along the platform 624 upon the portion 637 between flanges 626 and 627, they are presented to the flap-turning members 640 and 641 mounted on the end of the platform 638 and arranged to turn the side flaps of the cartons inwardly at top and bottom. These flap-turning members are provided at their sides with projecting fingers 642, 643, having their forward edges sharpened and arranged to enter between the flaps and the sides of the cartons, the upper edges of the members 642 and 643 being curved so that the flaps are turned inwardly, the lower flaps being first folded beneath the extension portion 637 of platform 624 and then passing through the space 639 upon the platform 638. A holding-down wire 644 (Fig. 7) extends above the platform 625 to the flap-turning member 640 and serves to hold the inwardly turned end flaps in their down position. Similar holding-down wires 645 and 646 extend from the member 640 above the platform 638 and hold the side flaps in their down position until the cartons are presented to the sealing devices. These devices paste sealing strips along the adjacent edges of the side flaps across the space between them and the ends of the paper strips overlie the folded-in end flaps, thus sealing the cartons and preventing the displacement of the flaps.

The sealing mechanism is illustrated in Figs. 49 and 50 and includes side plates 647 and 648 mounted on the platform 638 at each side of the cartons, the plate 647 being bent outwardly as at 649 to embrace the chain 628. These plates at their ends support mechanism for feeding and pasting the strips to be applied to the upper sides of the cartons and are provided with downwardly extending portions 650 and 651 beneath the platform 638 for supporting mechanism for feeding and pasting strips on the bottoms of the cartons. The two mechanisms are alike but in inverted relation, so that the description of the upper mechanism following applies equally to the lower mechanism.

On a shaft 652 is mounted a roll of pasting tape which is led between feed rollers 654 and 655 mounted on shafts 656 and 657, and thence beneath the pressure roller 658 which engages the upper sides of the cartons, this pressure roller being mounted on the shaft 659. The shaft 656 of roller 654 is yieldingly mounted in slots 660 in the side plates and forced toward the roller 655 by springs 661 so that it engages the paper tightly. A driving shaft 662 is journaled in the plates and carries pulleys 663 and 664 which are connected by belts 665 and 666 with pulleys 667 and 668 provided on the shafts 657 and 659 of the feed and pressure rolls respectively. The drive shaft 662 of the upper mechanism is driven from the corresponding drive shaft of the lower mechanism by a belt 669 which extends over pulleys 670 and 671, the drive shaft of the lower mechanism being intermittently driven by the mechanism by which the carton feeding mechanism is driven by a sprocket chain 672 extending around a sprocket gear 673 on the lower driving shaft 662 and a sprocket gear 674 on the shaft 675 which is driven from the shaft 634 upon which the chain driving sprocket 629 is mounted, by beveled gears 676 and 677.

The strip fed by rollers 654 and 655 beneath the roller 658 is cut periodically in proper lengths by means of a stationary knife blade 678 mounted between supporting plates with its edge in proximity to the inner face of the paper strip, while at the outer side of the latter is a blade 679 transversely disposed and mounted on a reciprocating bar 680 slidable in the guide 681 and connected at its end to one end of a trip lever 682 upon a shaft 683, this lever being provided at its other end with a roller 684 engaging a cam 685 on the shaft 662. A spring 686 is connected at one end to a pin 687 of the guide block 681 and at its other end to a pin 688 on the bar 680 which moves in the slot 689 in the block 681. The spring holds the roller 684 in engagement with the cam, and as the shaft is revolved the cam intermittently trips the lever 682, moving the blade 679 to cooperate with the stationary blade 678 to sever the length of paper.

The paper preferably employed is gummed on one side and as it is fed, the gummed surface is moistened by a roller 690 engaging a roller 691 which is rotated in a water pan 693. These rolls may be positively driven or driven by frictional contact of the roller 690 with the surface of the tape. As the cartons are fed through the strip-pasting devices, they advance along the platform 638 and are removed from the machine as the arms 631 pass around the sprocket gear 630, the filled cartons then being removed and delivered to the point where they are to be packed in cases.

The different associated devices in the apparatus are driven in suitable timed relation, and in the operation of the machine the shredding devices deposit a continuous cereal strand upon the strand conveyor, where the strand is divided into individual biscuits by the cutter chains. These biscuits are picked up by the upper cutter chain, carried out over the baking conveyor, and deposited in rows on the pans of this conveyor brought successively to rest beneath the depositing mechanism. The filled pans are carried through the oven and the drying chamber with a continuous movement and then are brought successively to rest beneath the delivery mechanism, where the individual blades of that mechanism engage adjacent biscuits in a row and transfer a group of biscuits to the inspection platform. The group of biscuits are moved across this platform in successive steps to a position in front of the feed bar by which two sub-groups, in this case of three biscuits each, are moved simultaneously to the two cartons. The group of three biscuits forms a layer in a carton and this layer is lowered in place by the packing platform. After a layer is placed in the carton, the platform moves downwardly a single step and the operations continue until the cartons are filled, whereupon the filled cartons are ejected and empty cartons fed to filling position. During the packing operation collapsed cartons are withdrawn from the hopper and opened, and the opened cartons fed successively to the packing station. In this movement the bottom end flaps of the opened cartons are turned inwardly.

The operation of the carton opening and moving devices is so timed that while the packing devices are filling the cartons in a succession of operations, two empty cartons are placed in position in front of the packing station. Upon the next action of the parts, the filled cartons are removed, two empty cartons substituted in their places, and the packing platforms moved to the tops of these cartons to receive the first layers of biscuits. In the last filling operation for each carton, the platforms are withdrawn from the lower end of the cartons so that the cartons may be ejected. Beneath each layer of biscuits is placed a strip of paper, the paper being drawn from a supply and strips of the desired length severed from it. Passing from the filling devices, the cartons have their flaps folded appropriately to close the cartons, and thereafter a sealing mechanism operates to apply sealing strips to hold the flaps in closed position.

I claim:

1. In apparatus of the type described, the combination of an oven, an endless conveyor movable into, through, and out of the oven, a traveling feeding mechanism cooperating with a portion of the conveyor to deposit articles to be baked thereon, and a delivery device spaced from the feeding mechanism and cooperating with a portion of the conveyor lying outside the oven, this device having a movement transverse to the direction of movement of the conveyor and operating to remove the articles from the conveyor after they have been carried on the latter through the oven.

2. In apparatus of the type described, the combination of an oven, an endless conveyor movable into, through, and out of the oven, means for advancing the conveyor with a continuous movement, means for giving a portion of the conveyor lying outside of the oven an intermittent advancing movement during the continuous movement of the remainder of the conveyor, a traveling feeding mechanism cooperating with the portion of the conveyor lying outside the oven to deposit articles to be baked upon a portion of the conveyor while it is at rest, and a delivery device spaced from the feeding mechanism lengthwise of the conveyor and operating in a direction transverse to the direction of movement of the conveyor to remove baked articles from a portion of the conveyor while it is at rest.

3. In apparatus of the type described, the combination of an oven, an endless conveyor movable into, through and out of the oven, a traveling feeding mechanism cooperating with a portion of the conveyor to deposit articles thereon in rows extending across the conveyor, and a delivery device spaced from the feeding mechanism and movable in a direction transverse to the direction of movement of the conveyor to withdraw groups of baked articles from the conveyor in single file.

4. In apparatus of the type described, the combination of an oven, an endless conveyor movable into, through, and out of the oven, means for advancing the conveyor with a continuous movement, means for advancing a portion of the conveyor lying outside the oven with an intermittent movement during the continuous movement of the remainder of the conveyor, a traveling feeding mechanism cooperating with a portion of the conveyor to deposit articles to be baked thereon in rows extending across the conveyor while said portion of the conveyor is at rest, and a delivery device spaced from the feeding mechanism lengthwise of the conveyor and operating to remove from a portion of the conveyor groups of articles arranged in single file while the said portion is at rest.

5. In apparatus of the type described, the combination of an oven, an endless conveyor movable into, through, and out of the oven, a traveling feeding mechanism cooperating with the portion of the conveyor lying outside the oven to deposit articles to be baked upon the conveyor, and a delivery device spaced from the feeding mechanism and cooperating with the conveyor, this device carrying a plurality of members each of which is adapted to engage an individual article and to remove this article from the conveyor upon the operation of the device.

6. In apparatus of the type described, the combination of an oven, an endless conveyor having a portion lying within the oven, a traveling feeding mechanism operable to deposit articles on the conveyor in rows extending transversely of the conveyor, and a delivery device spaced from the feeding mechanism and having a plurality of members arranged in line and each adapted to engage an article in a row across the conveyor, the delivery device being movable in a direction transverse to the direction of movement of the conveyor and in correspondence with this movement whereby the articles of a row on the conveyor are moved individually in single file from the conveyor.

7. In apparatus of the type described, the combination of an oven, an endless conveyor movable into, through, and out of the oven, a traveling feeding mechanism cooperating with a portion of the conveyor to deposit articles to be baked upon the conveyor, and a delivery device spaced from the feeding mechanism and cooperating with the conveyor to remove the articles from the conveyor after they have been carried on the latter through the oven and to deliver these articles to a selected point in successive steps.

8. In apparatus of the type described, the combination of an oven, an endless conveyor movable into, through, and out of the oven, means for advancing the conveyor with a continuous movement, means for giving a portion of the conveyor lying outside the oven an intermittent advancing movement during the continuous movement of the remainder of the conveyor, a traveling feeding mechanism operating to deposit articles to be baked upon a portion of the conveyor while it is at rest, and a delivery device spaced from the feeding mechanism lengthwise of the conveyor and operating to remove baked articles from a portion of the conveyor while it is at rest and to deliver the articles from the conveyor to a selected point in successive steps.

9. In apparatus of the type described, the combination of an oven, an endless conveyor movable into, through, and out of the oven, means for advancing the conveyor with a continuous movement, means for giving a portion of the conveyor lying outside the oven an intermittent advancing movement during the continuous movement of the remainder of the conveyor, a traveling feeding mechanism cooperating with a portion of the conveyor and operating to deposit articles on the conveyor in rows extending across the conveyor, and a delivery device spaced from the feeding mechanism lengthwise of the conveyor and operating in a direction transverse to the direction of movement of the conveyor to remove groups of baked articles arranged in single file from said intermittently advancing portion of the conveyor while it is at rest, this device being arranged to deliver these groups of articles to a selected point in successive steps.

10. In apparatus of the type described, the combination of an oven, an endless conveyor movable into, through, and out of the oven, means for advancing the conveyor with a continuous movement, means for giving a portion of the conveyor lying outside the oven an intermittent advancing movement during the continuous movement of the remainder of the conveyor, a traveling feeding mechanism cooperating with a portion of the conveyor to deposit articles on the conveyor in rows extending across the conveyor, and a delivery device spaced from the feeding mechanism and having a plurality of members arranged thereon in line and each adapted to engage an article in a row across the conveyor, said device being movable in a direction transverse to the direction of movement of the conveyor and in correspondence with the step by step advance of said intermittently advancing portion of the conveyor to remove a group of articles from the conveyor in single file, the device having a movement of less extent than the length of a row.

11. In apparatus of the type described, the combination of an oven, an endless conveyor movable into, through, and out of the oven, a continuously moving feeding mechanism operating to deposit articles to be baked on the conveyor, and a reciprocating delivery device spaced from the feeding mechanism and cooperating with the portion of the conveyor lying outside the oven, this device reciprocating in a direction transverse to the conveyor and operating upon each reciprocation away from the conveyor to remove articles therefrom after they have been carried on the conveyor through the oven.

12. In apparatus of the type described, the combination of an oven, an endless conveyor movable into, through, and out of the oven, a traveling feeding mechanism operating to deposit articles to be baked upon the conveyor, and a delivery device spaced from the feeding mechanism and cooperating with the conveyor to remove articles from the conveyor after they have been carried on the latter through the oven, this device including conveying means operating to transfer the articles out of the path in which they are removed from the conveyor to a packing station.

13. In apparatus of the type described, the combination of an oven, an endless conveyor movable into, through, and out of the oven, a traveling feeding mechanism operating to deposit articles to be baked upon the conveyor, and a delivery device spaced from the feeding mechanism and operating to remove articles from the conveyor after they have been carried on the latter through the oven, this device including reciprocating conveying means operating to transfer the articles removed by said device out of their path of travel from the conveyor to a packing station.

14. In apparatus of the type described, the combination of an oven, an endless conveyor movable into, through, and out of the oven, a traveling feeding mechanism cooperating with the conveyor to deposit articles to be baked upon the conveyor, a platform outside the oven adjacent the conveyor and spaced from the feeding mechanism, and a delivery device outside the oven cooperating with the conveyor to remove articles from the conveyor after they have been carried on the latter through the oven and to deposit the articles upon the platform.

15. In apparatus of the type described, the combination of an oven, an endless conveyor movable into, through, and out of the oven, a traveling feeding mechanism cooperating with the conveyor to deposit articles to be baked thereon, a platform adjacent the conveyor and spaced from the feeding mechanism, and a delivery device cooperating with the portion of the conveyor to remove articles from the conveyor along a path transverse to the conveyor after the articles have been carried on the conveyor through the oven and to deposit the articles upon the platform, this device including conveying means for transferring the articles deposited upon the platform to a packing station.

16. In apparatus of the type described, the combination of an oven, an endless conveyor movable into, through, and out of the oven, a traveling feeding mechanism cooperating with a portion of the conveyor to deposit articles to be baked thereon, and a delivery device spaced from the feeding mechanism and operating in a direction transverse to the direction of movement of the conveyor to remove articles from the conveyor after they have been carried on the latter through the oven and to deliver these articles to a selected point in successive steps.

17. In apparatus of the class described, the combination of an oven, a conveyor movable into, through, and out of the oven, means for depositing articles to be baked on the conveyor, a delivery device operating to withdraw groups of baked articles from the conveyor in single file and to deliver these articles to a packing station, means for feeding cartons to the station, and packing mechanism at the station operating to introduce the delivered groups of articles into the cartons while maintaining the articles in the arrangement in which they were removed from the conveyor.

18. In apparatus of the class described, the combination of an oven, a conveyor movable into, through and out of the oven, means for depositing articles to be baked in transverse rows on the conveyor, a delivery device operating transverse to the conveyor to withdraw groups of baked articles from the conveyor in rows in single file and to deliver these articles to a packing station, means for feeding cartons to the station, and packing mechanism at the station operating to introduce the delivered groups of articles into the cartons while maintaining the articles in the arrangement in which they are removed from the conveyor.

In testimony whereof I affix my signature.

HENRY ALONZO HOUSE.